(12) United States Patent  
Bruderlin et al.

(10) Patent No.: US 8,704,841 B2  
(45) Date of Patent: Apr. 22, 2014

(54) METHOD AND APPARATUS FOR THE DIGITAL CREATION OF FUR EFFECTS

(75) Inventors: Armin Walter Bruderlin, Los Angeles, CA (US); Clint Hanson, Vancouver (CA)

(73) Assignees: Sony Corporation, Tokyo (JP); Sony Pictures Entertainment Inc., Culver, CA (US)

(*) Notice: Subject to any disclaimer, the term of this patent is extended or adjusted under 35 U.S.C. 154(b) by 132 days.

(21) Appl. No.: 11/345,355

(22) Filed: Feb. 1, 2006

(65) Prior Publication Data

US 2006/0158453 A1    Jul. 20, 2006

Related U.S. Application Data

(63) Continuation of application No. 10/052,068, filed on Jan. 16, 2002, now Pat. No. 7,050,062, which is a continuation of application No. 09/370,104, filed on Aug. 6, 1999, now Pat. No. 6,952,218.

(51) Int. Cl.
  G09G 5/00   (2006.01)
  G06T 11/00  (2006.01)
  G06T 15/04  (2011.01)
  G06T 19/00  (2011.01)
  G06T 13/40  (2011.01)

(52) U.S. Cl.
  CPC .......... G06T 11/001 (2013.01); G06T 15/04 (2013.01); G06T 19/00 (2013.01); G06T 13/40 (2013.01)
  USPC ........... 345/581; 345/419; 345/582; 345/473; 345/474; 382/100

(58) Field of Classification Search
  CPC ....... G06T 11/001; G06T 15/04; G06T 19/00; G06T 13/40
  USPC .................. 345/581, 441–442, 473–475, 419
  See application file for complete search history.

(56) References Cited

U.S. PATENT DOCUMENTS 4,519,037 A   5/1985   Brodeur et al.
4,731,743 A   3/1988   Blancato
(Continued)

FOREIGN PATENT DOCUMENTS

JP    09-326042     12/1997
JP    2001-297331   10/2001
(Continued)

OTHER PUBLICATIONS

N. M. Thalmann, "Virtual Clothes, Hair and Skin for Beautiful Top Models", in Proc. Computer Graphics International, Jun. 24-28, 1996, Pohang, Korea, IEEE Computer Society Press, Jun. 1996, pp. 132-141.*

(Continued)

*Primary Examiner* — Jin-Cheng Wang
(74) *Attorney, Agent, or Firm* — Blakely, Sokoloff, Taylor & Zafman LLP

(57) ABSTRACT

A system and method to generate digital representations of hair or animal fur on surfaces. In one embodiment the system and method includes methods to automatically place hairs on surfaces, comb the placed hairs, adjust the hairs on surface boundaries to ensure continuity across surface patches, selectively break hairs along fur tracks, and selectively clump hairs to provide wet fur looks. Rendering techniques are applied to the hairs to produce realistic two-dimensional images.

8 Claims, 21 Drawing Sheets

(56) References Cited

U.S. PATENT DOCUMENTS

| | | | |
|---|---|---|---|
| 4,872,056 A | 10/1989 | Hicks et al. | |
| 5,319,705 A | 6/1994 | Halter et al. | |
| 5,404,426 A * | 4/1995 | Usami et al. | 345/420 |
| 5,437,600 A | 8/1995 | Liboff et al. | |
| 5,758,046 A | 5/1998 | Rouet et al. | |
| 5,764,233 A | 6/1998 | Brinsmead et al. | |
| 5,777,619 A | 7/1998 | Brinsmead | |
| 6,097,396 A * | 8/2000 | Rouet et al. | 345/582 |
| 6,300,960 B1 | 10/2001 | DeRose et al. | |
| 6,333,985 B1 | 12/2001 | Ueda et al. | |
| 6,348,924 B1 | 2/2002 | Brinsmead | |
| 6,559,849 B1 | 5/2003 | Anderson et al. | |
| 6,720,962 B1 | 4/2004 | Alter | |
| 6,952,218 B1 * | 10/2005 | Bruderlin | 345/581 |
| 7,050,062 B2 * | 5/2006 | Bruderlin | 345/581 |
| 7,348,973 B1 | 3/2008 | Gibbs et al. | |
| 7,609,261 B2 | 10/2009 | Gibbs et al. | |
| 2002/0021302 A1 | 2/2002 | Lengyel | |
| 2004/0227757 A1 | 11/2004 | Petrovic et al. | |
| 2005/0253842 A1 | 11/2005 | Petrovic et al. | |

FOREIGN PATENT DOCUMENTS

| | | | |
|---|---|---|---|
| WO | | 01/11562 A2 | 2/2001 |
| WO | WO 01/11562 A2 | | 2/2001 |

OTHER PUBLICATIONS

Y. Watanabe and Y. Suenaga, "A Trigonal Prism-Based Method for Hair Image Generation", p. 47-53, Jan. 1992 IEEE.

A. Daldegan, N. M. Thalmann, T. Kurihara, and D. Thalmann, "An Integrated System for Modeling, Animating and Rendering Hair", Eurographics, 1993 vol. 12 No. 3, pp. 211-221.

Anjyo, Ken-Ichi et. al "A Simple Method for Extracting the Natural Beauty of Hair", Commputer Graphics, vol. 26, No. 2, Jul. 1992. pp. 111-120.

G.S. P. Miller, "From Wire-Frames to Furry Animals", Proceedings on Graphics interface'88, p. 138-145, Dec. 1989, Edmonton, Alberta, Canada.

Goldman, Dan B., "Fake Fur Rendering", Computer Graphics Processing, Annual Conference Series, Aug. 3-8, 1997.

Van Gelder, Allen et al. 1997. "An Interactive Fur Modeling Technique", University of Santa Cruz, pp. 1-6.

Waiming Kong, et al., "Visible Volume Buffer for Efficient Hair Expression and Shadow Generation," p. 58-64, 1999 IEEE.

Ando & Morishima, "Expression and Motion Control of Hair Using Fast Collision Detection Methods", Faculty of Engineering, Seikei University, Tokyo, Japan, p. 463-470.

Miller, Gavin S.P., "From WIre-Frames to Furry Animals", Graphics Interface 1988, pp. 138-145.

Kajiya, James T. et al., "Rendering Fur with Three Dimensional Textures", Computer Graphics, vol. 23, No. 3, Jul. 1989, pp. 271-280.

Rankin, J. et al. "A Simple Naturalistic Hair Model", Computer G raphics, pp. 5-9, Feb. 1996.

Office Action from U.S. Appl. No. 11/801,829, mailed Apr. 17, 2008, 13 pgs.

PCT Notification of Transmittal of the International search Report and the Written Opinion of the Intenrational Searching Authority, of the Declaration.

Bruderlin, Armin W., "A Basic Hair/Fur Pipeline", *Paper in course # 9: Photorealistic Hair Mode Animation, and Rendering. ACM SIGGRAPH Course*, (2004).

Bruderlin, Armin W., "Production Hair/Fur Pipeline at Imageworks", *Presentation in Course # 9: Photorealistic Hair Modeling, Anmiation and Rendering. ACM SIGGRAPH Course*, (2004).

Dave, J., et al., "The Chronicles of Narnia: The Lion, The Crowds and Rhythm and Hues", *ACM SIGGRAPH Course # 34*, (2006).

Magnenat-Thalmann, Nadia, "The Simulation of Ancient Hairstyle in Real-Time", *ACM SIGGRAPH 2004*, (2004).

Magnenat-Thalmann, Nadia, et al., "Virtual Clothes, Hair and Skin for Beautiful Models", *Proc. Computer Graphics International*, (Jun. 24, 1996), pp. 132-141.

Marschner, Stephen R., et al., "Light Scattering from Human Hair Fibers", *ACM Transactions on Graphics 2003 Cornell University*, (2003).

Moon, J. T., et al., "Simulating Multiple Scattering in Hair Using a Photon Mapping Approach", *ACM Transactions on Graphics*, 25, 3, 1067-1074, (2006).

Paris, S., et al., "Capture of Hair Geometry from Multiple Images", *ACM Transactions on Graphics*, 23, 3,, (2004), 712-719.

Preston, Martin, et al., "Grooming, Animating, & Rendering Fur for "King Kong"", *ACM SIGGRAPH Sketch*, (2006).

Ward, Kelly, et al., "A Survey on Hair Modeling: Styling, Simulation, and Rendering", *IEEE Transactions on Visualization and Computer Graphics*, vol. 13, No. 2, (Mar./Apr. 2007).

Office Action from U.S. Appl. No. 11/801,924 mailed Aug. 7, 2008, 13 pages.

Office Action for U.S. Appl. No. 11/801,923, filed May 11, 2007, 1st Named Inventor: Armin Walter Bruderlin, mailed Aug. 27, 2008, 9 pages.

Office Action for U.S. Appl. No. 11/880,588, 1st Named Inventor Armin Walter Bruderlin, Mailed Aug. 20, 2008, 11 pages.

Office Action for U.S. Appl. No. 11/880,594, filed Jul. 23, 2007, 1st Named Inventor: Armin Walter Bruderlin, Mailed Aug. 20, 2008, 13 pages.

Office Action for U.S. Appl. No. 11/801,913, filed May 11, 2007, 1st Named Inventor: Armin Walter Bruderlin, Mailed Aug. 19, 2008, 11 pages.

"Alias Systems Hair and Dynamic Curves", *Maya Version 6*, Toronto, Canada, (2004), pp. 1-100.

Alter, Joseph, "Shave and a Haircut Version 4.5", manual 4.5, (2007), pp. 1-56.

Alter, Joe, "Shave and a Haircut, Real Hair, Real Fast", www.joealter.com/docs/shavedoc.html,, (2000), pp. 1-37.

Bertails, Florence, et al., "A Practical Self-Shadowing Algorithm for interactive Hair Animation", *ACM International Conference Proceeding Series*; vol. 112 *Proc.of Graphics Interface 2005* ,Victoria, British Columbia, (2005), pp. 71-78.

Iones, A., et al., "Fur and Hair: Practical Modeling and Rendering Techniques", *Proc. IEEE International Conference on Information Visualization*, (Jul. 2000), pp. 145-151.

Ward, Kelly, et al., "Modeling Hair Using Level-of-Detail Representations", *Proc. of the 16th International Conf. on Computer Animation and Social Agents, CASA '03*, (2003).

United States Office Action U.S. Appl. No. 11/801,914 1st Named Inventor: Armin Walter Bruderlin, Mailed Sep. 18, 2008, 13 pages.

U.S. Appl. No. 11/801,829 Office Action, mailed Nov. 6, 2008.

Bertails, F., et al., "Adaptive Wisp Tree—a multiresolution control structure for simulating dynamic clustering in hair motion", *Eurographics, SIGGRAPH Symposium on Computer Animation*, (2000).

United States Office Action U.S. Appl. No. 11/880,588, mailed Jan. 8, 2009.

United States Office Action U.S. Appl. No. 11/880,594 mailed Jan. 26, 2009.

Office Action for U.S. Appl. No. 11/801,924, mailed Feb. 6, 2009.

U.S. Appl. No. 11/801,923 Final Office Action mailed Feb. 24,2009.

U.S. Appl. No. 11/801,914 Office Action mailed Mar. 11, 2009.

U.S. Appl. No. 11/801,913 Office Action mailed Mar. 19, 2009.

U.S. Appl. No. 11/801,829 Office Action, mailed May 14, 2009.

U.S. Appl. No. 11/801,913, Office Action mailed Jun. 30, 2009.

U.S. Appl. No. 11/880,594, Office Action mailed Jun. 26, 2009.

U.S. Appl. No. 11/880,588 Office Action mailed Jun. 4, 2009.

U.S. Appl. No. 11/801,924 Office Action mailed Jul. 15, 2009.

U.S. Appl. No. 11/801,913, mailed Jul. 31, 2009.

Ward, Kelly, et al., "Adaptive Grouping and Subdivision for Simulating Hair Dynamics", *Proc. Pacific Graphics Conf. Computer Graphics and Applications*,, (Oct. 2003), pp. 234-243.

U.S. Appl. No. 11/801,914 Office Action mailed Oct. 29, 2009.

U.S. Appl. No. 11/801,829, Final Office Action mailed Jan. 7, 2010.

U.S. Appl. No. 11/801,924, Final Rejection Action mailed Feb. 16, 2010.

(56) References Cited

OTHER PUBLICATIONS

U.S. Appl. No. 11/880,588, Final Rejection mailed Feb. 5, 2010.
U.S. Appl. No. 11/880,594, Final Rejection Action mailed Feb. 16, 2010.
U.S. Appl. No. 11/801,923 Final Rejection Action mailed Feb. 16, 2010.
U.S. Appl. No. 11/801,925 Office Action mailed Mar. 19, 2010.
U.S. Appl. No. 11/801,913 Office Action, mailed Mar. 30, 2010.
U.S. Appl. No. 11/801,914, Final Rejection mailed Jun. 25, 2010.
EPO Extended Search Report, Application No. 12189025.5 dated Jan. 2, 2013.
Official Decision of Grant for Registration issued in related application JP Application No. 2009-521798.
Bruderlin, Armin W., "A Method to Generate Wet and Broken-Up Animal Fur," Computer Graphics and Applications 1999 Proc., 7th Pac. Conf. Oct. 5-7 pp. 242-249.
U.S. Appl. No. 11/801,924 Notice of Allowance mailed Apr. 24, 2013.
U.S. Appl. No. 11/801,924 Notice of Allowance mailed Sep. 3, 2013.
U.S. Appl. No. 11/801,925 Notice of Allowance mailed Sep. 24, 2010.
U.S. Appl. No. 11/801,913 Non-Final Office Action mailed Aug. 1, 2013.
U.S. Appl. No. 11/801,923 Non-Final Office Action mailed Sep. 4, 2013.
U.S. Appl. No. 11/801,923 Advisory Action mailed May 8, 2009.
U.S. Appl. No. 11/801,914 Non-Final Office Action mailed Jul. 30, 2013.
U.S. Appl. No. 11/801,829 Final Office Action mailed Sep. 4, 2012.
U.S. Appl. No. 11/801,829 Non-Final Office Action mailed Feb. 22, 2012.
U.S. Appl. No. 11/801,829 Advisory Action mailed Mar. 16, 2010.
U.S. Appl. No. 11/801,829 Advisory Action mailed Mar. 18, 2009.
U.S. Appl. No. 11/880,594 Notice of Allowance mailed Sep. 3, 2013.
U.S. Appl. No. 11/880,588 Non-Final Office Action mailed Jul. 18, 2013.
Alia Systems, "Hair and Dynamic Curves", Version 6, 2004.
Japanese Patent Application No. 2012-143262, Official Action dated Apr. 22, 2013.
U.S. Appl. No. 11/801,829, Non Final Office Action mailed May 6, 2013.

\* cited by examiner

FIG. 10a
FIG. 10b
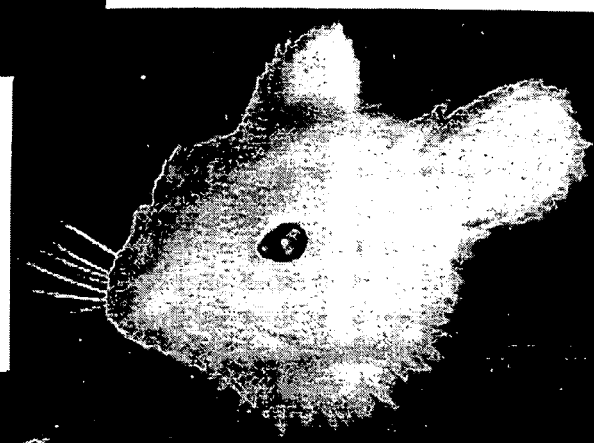
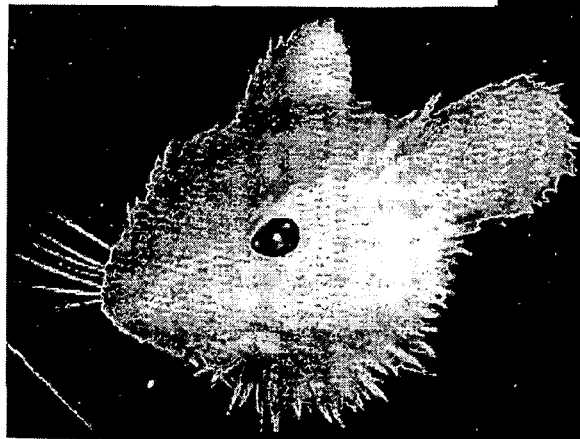
FIG. 10c
FIG. 10d
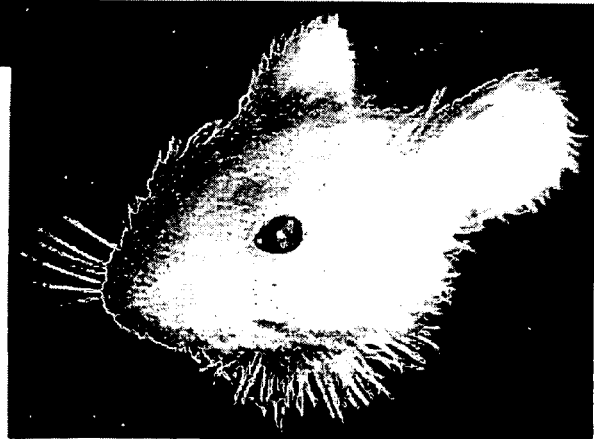

US 8,704,841 B2

METHOD AND APPARATUS FOR THE DIGITAL CREATION OF FUR EFFECTS

This application is a Continuation of application Ser. No. 10/052,068, filed Jan. 16, 2002 now U.S. Pat. No. 7,050,062 which is a Continuation of application Ser. No. 09/370,104, filed on Aug. 6, 1999 now issued as U.S. Pat. No. 6,952,218.

BACKGROUND OF THE INVENTION

1. Field of the Invention

The invention relates to the digital creation of fur. More particularly, the present invention relates to the digital creation of realistic close-up and distant looks of fur coats on animal models.

2. Art Background

One of the many challenges in modeling, animating and rendering believable mammals in computer graphics has been to produce realistic-looking fur. A real fur coat is made up of hundreds of thousands of individual, cylindrical hairs covering the skin, and fulfills vital functions such as protection against cold and predators. Between animals as well as across the body of individual animals, the look and structure of these hairs vary greatly with respect to length, thickness, shape, color, orientation and under/overcoat composition. In addition, fur is not static, but moves and breaks up as a result of the motion of the underlying skin and muscles, and also due to external influences, such as wind and water.

Some prior computer graphics techniques used for fur creation have achieved convincing looks of smooth fur; however, these techniques do not take into account that real fur often breaks up at certain areas of the body, such as around the neck. In addition, the prior methods do not account for hairs of wet fur clump together resulting in a significantly different appearance compared to dry fur. Also, the process of simulating hair as it is getting increasingly wet when sprinkled on by water has not yet been addressed.

SUMMARY OF THE INVENTION

The system and method of the present invention provides a flexible technique for the digital representation and generation of realistic fur coats on geometric models of surfaces, such as animals. In one embodiment, an innovative technique for placement, adjustment and combing of fur on surfaces is provided. In one embodiment, the continuity of fur across surface patch boundaries is maintained. In addition, in one embodiment, an innovative method to simulate wet fur is provided. In this method static clumping and animated clumping may be applied to regions on the surfaces. In one embodiment, a method for the symmetric and one-sided breaking of hairs along fur-tracks on surfaces is provided. The above processes can be iteratively applied in order to generate layers of fur, such as an undercoat and an overcoat.

BRIEF DESCRIPTION OF THE DRAWINGS

The objects, features and advantages of the present invention will be apparent from the following detailed description in which:

FIG. 10a shows a rendered frame of a combed fur coat and FIGS. 10b, 10c and 10d show snapshots of one embodiment of an animated dry-to-wet fur sequence.

DETAILED DESCRIPTION

Figure 1A:
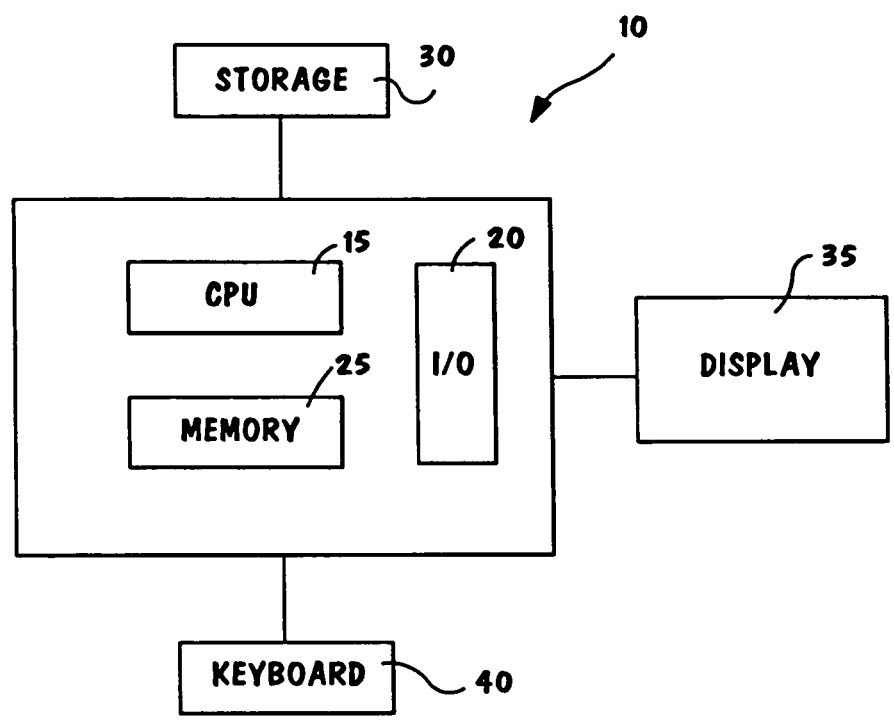
FIGS. 1a and 1b are simplified block diagrams of embodiments of systems that operate in accordance with the teachings of the present invention.

The method and apparatus provides an innovative technique for the digital generation of fur on surfaces, such as on a computer generated animal. FIG. 1a is a simplified block diagram of one embodiment that operates in accordance with the teachings of the present invention. Computer system 10 includes central processing unit (CPU) 15, memory 25, Input/Output 20, which may be coupled to a storage device such as a disk drive or other device. The system may also include a keyboard 40 or other user input device as well as a display 35 that may be used to display user interface and the final rendering of the fur in accordance with the teachings of the present invention.

In one embodiment, memory 25 stores instructions which when executed by the CPU 15 performs the processes described herein. Alternately, the instructions may be received via storage 30 or other input such a user input 40. The processes described herein may be executed via software by a system such as system 10 or hardware, or a combination of both hardware and software.

Figure 1B:
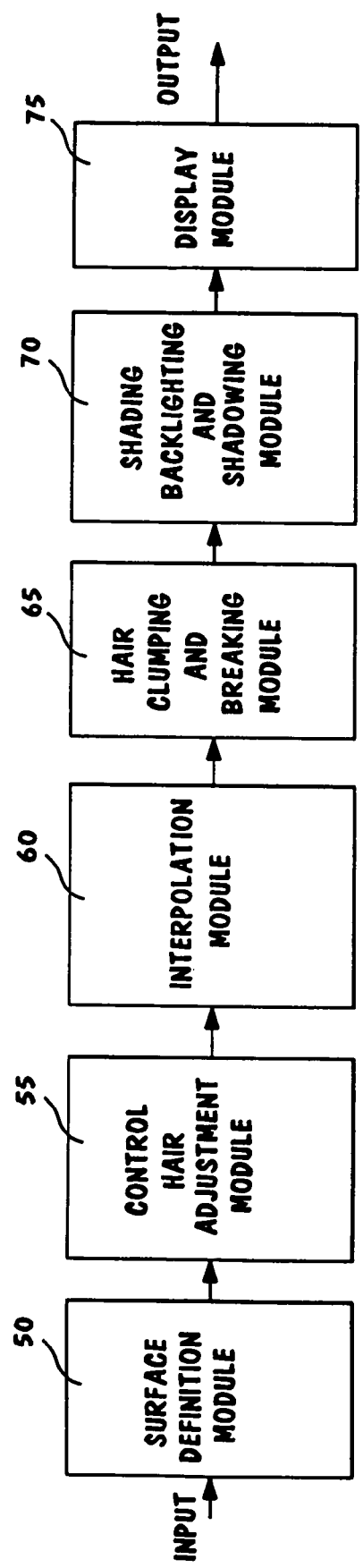
Figure 2:
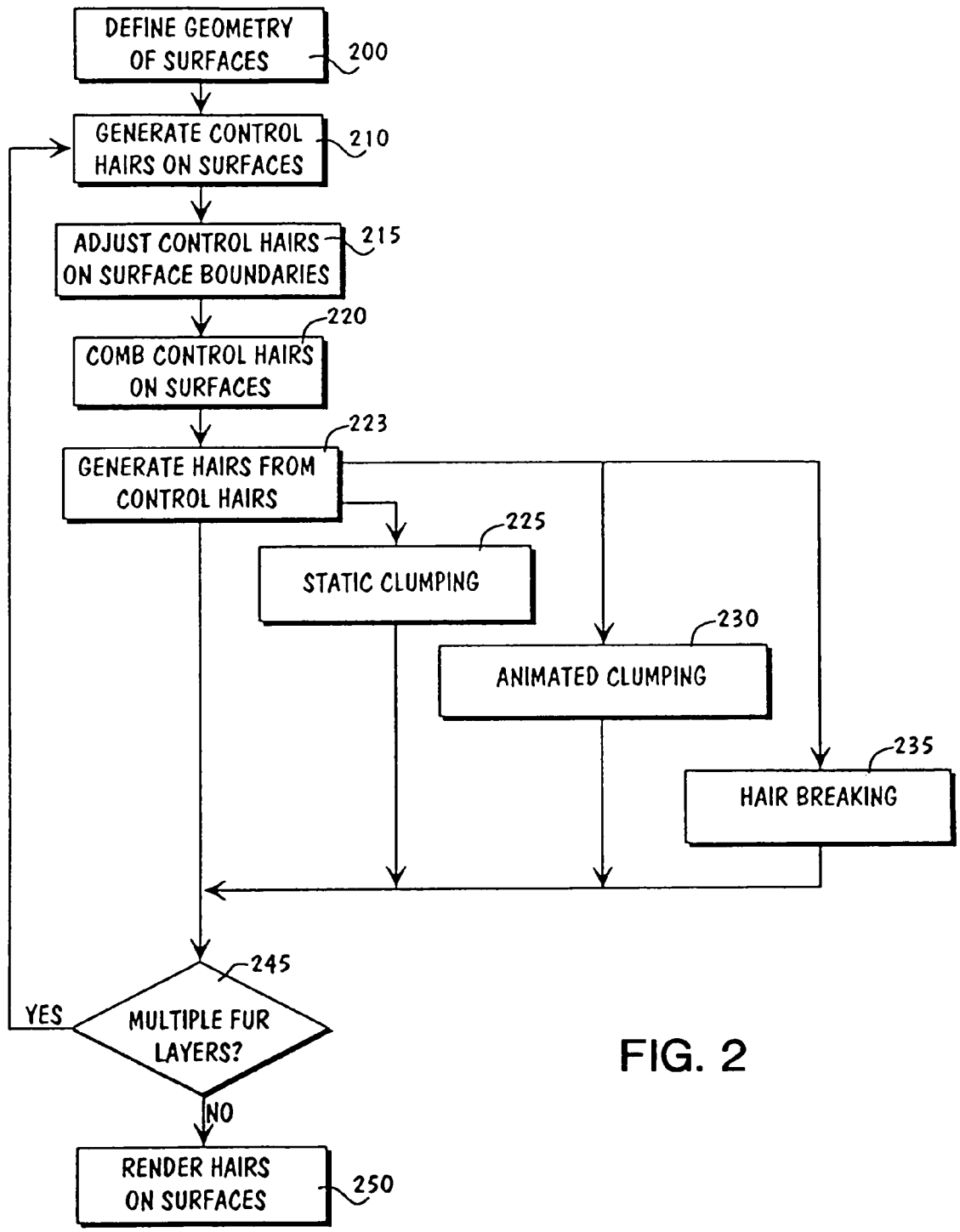
FIG. 2 is a flow diagram of one embodiment of a process for the generation of fur in accordance with the teachings of the present invention.
Figure 3A:
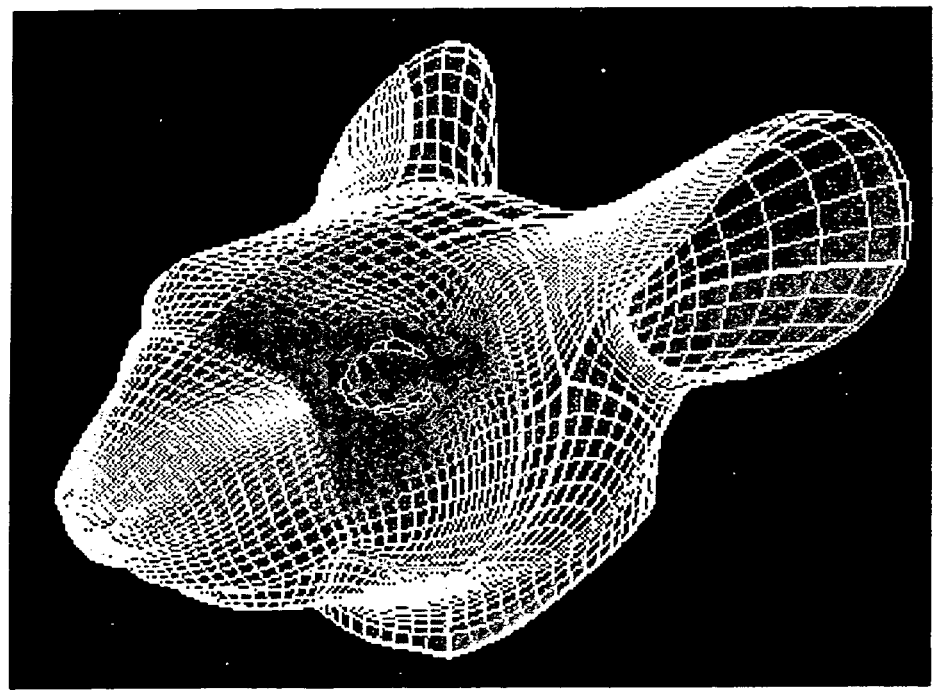
FIG. 3a is an illustration of a set of parametric surfaces defining the skin of a three-dimensional animal model.

An alternate embodiment is illustrated in FIG. 1b. Input is received by surface definition module 50 that defines a surface which, as will be explained below, defines surfaces and control hairs of the object to be rendered. Module 55 adjusts the control hairs to provide such functionality as combing and seamless hairs across surface boundaries. The interpolation module 60 interpolates across the surfaces using the control hairs. Hair clumping and breaking module 65 enhances the realistic visualization of the object by providing for clumping and breaking of hairs. Rendering module 70 renders the hairs and provides shading, black lighting and shadowing effects to the hairs, and module 75 displays the final output of the object with the hair surfaces FIG. 2 is a flow diagram of the steps involved in generating fur coat in accordance with the teachings of the present invention. At step 200, the geometry of the surfaces that contain the hair is defined. In one embodiment, a three-dimensional geometry may be used to model the skin, for example an animal skin, on which the fur coat is later generated. As illustrated in FIG. 3*a*, the geometry is usually defined as a connected set of parametric surfaces often referred to as surface patches. The patches can be generated a number of ways known to one skilled in the art. In one embodiment, NURBS surface patches are used.

Referring back to FIG. 2, at step 210, control hairs are placed onto these surface patches, whereby each control hair is modeled as a parametric curve, e.g., a NURBS curve, defined by a user-specified number of control vertices. As will be discussed below, a global density value for the hair is given by the user to determine the number of actual hairs and their positions on the surface patches. Each hair also has a number of attributes such as length, width, waviness, opacity, and by default points in the direction of the surface normal at its position on the surface.

In the present embodiment, a number of operations are performed on control hairs and the final hairs are generated based upon the control hairs and other information. However, it should be realized that these steps, such as combing and the like described herein may be performed on the final hairs instead of the control hairs.

A number of different approaches may be taken to generate the control hairs. One simple algorithm places equally spaced x hairs in the u direction and y hairs in the v direction (where x and y are specified by the user) of each NURBS patch. Alternately, the x and y hairs are placed equally by arc-length. This will result in a more uniform distribution across the patch. However, it does not achieve a balanced distribution of control hairs across patches of different sizes; x and y hairs are placed on all selected patches, whether large or small. Therefore, in an alternate embodiment, the generation of control hairs takes into account the area of a NURBS patch to determine x and y for each patch. In one embodiment, the user specifies z hairs per unit area. In addition in one embodiment, control hairs can also be placed individually or along curves-on surfaces for finer control. For example, extra control hairs along the sharp rim of the ears of an animal can be generated to ensure proper alignment of the fur eventually generated.

Figure 4:
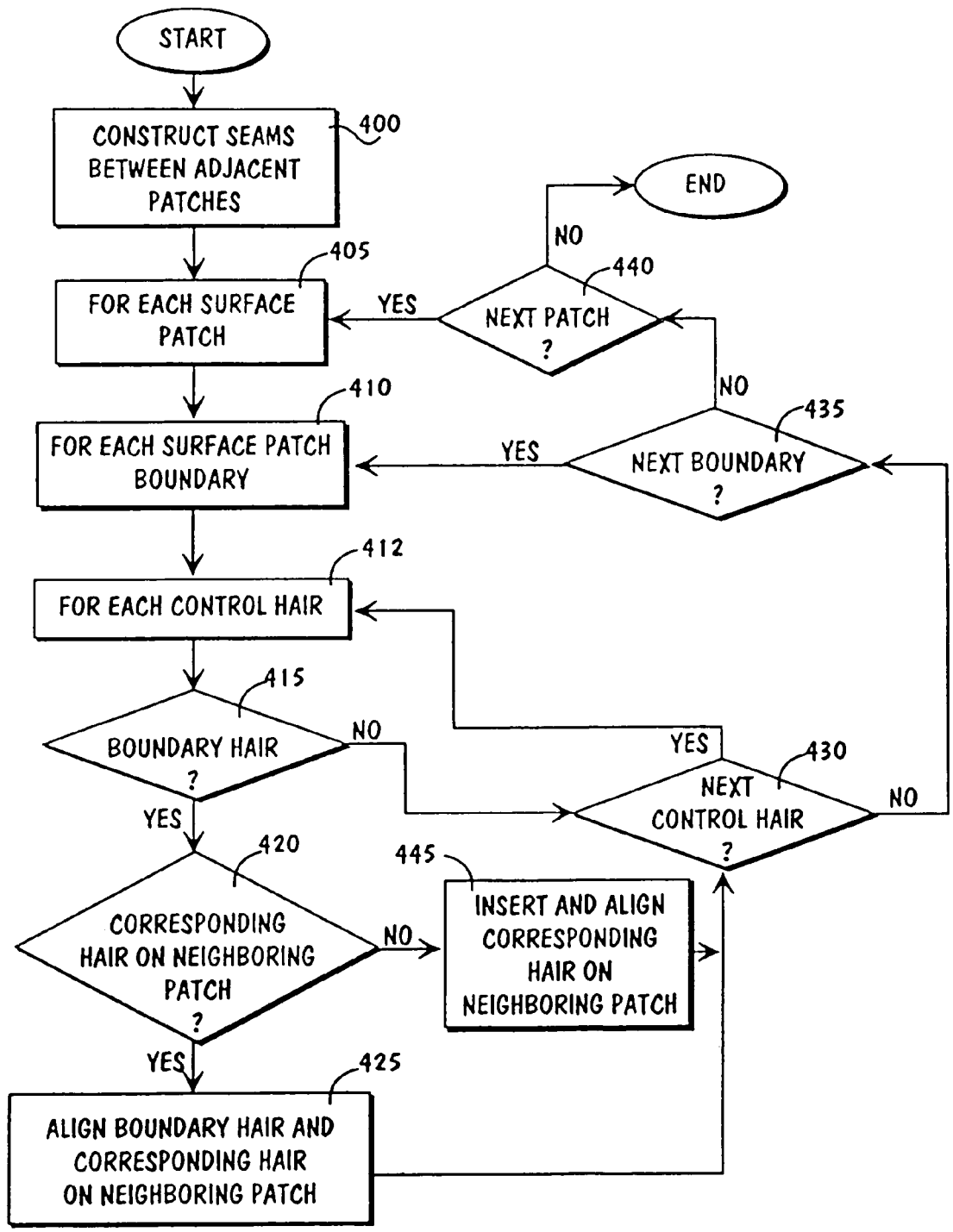
FIG. 4 is a flow chart illustrating one embodiment of a process for adjusting control hairs for removing visual discontinuities at surface boundaries.

Referring back to FIG. 2, once the control hairs are generated, step 210, the control hairs are adjusted at the surface boundaries. Since control hairs are placed in each surface patch, control hairs that lie on the boundary of a surface patch might not line up with control hairs on a neighboring surface patch; this can lead to visible discontinuities of the hairs along the surface boundaries. To address the potential problem, the control hairs on surface boundaries are adjusted. One embodiment of the process for adjusting the control hairs is illustrated by the flow chart of FIG. 4.

At step 400, seams are constructed between adjacent surfaces. Each seam identifies adjacent surfaces along a corresponding boundary (for example, an entire edge, T-junctions, or corners) of a surface patch. At step 405, for each surface patch, the boundaries are traversed, step 410. Each control hair is examined, step 412. At step 415, if a boundary hair is found, at step 420, the neighboring patches, as identified by a corresponding seam, are checked to see if there is a corresponding hair on the neighboring patch. In one embodiment, a hair is corresponding if it is within a small predetermined distance from the boundary hair. The distance may be specified in parametric u, v, or absolute space. In one embodiment, the predetermined distance may be a relatively small distance such that the hairs visually appear co-located.

If there is a corresponding control hair, the boundary hair and the corresponding hair are aligned, step 425, by modifying the location and orientation of one or both of the control hairs to a common location and orientation, respectively. In one embodiment, the corresponding hair of an adjacent surface patch is snapped to the location of the boundary hair along the boundary. In one embodiment, if the neighboring surface patch does not have a corresponding hair, then one is inserted and aligned on the neighboring patch, step 445. The process continues for each boundary hair along each boundary in each surface patch, steps 430, 435 and 440 until all boundary hairs are aligned.

Referring back to FIG. 2, after step 215, in one embodiment, the control hairs have been placed on the surfaces defining an animal or other object model and the control hairs point along a surface normal at their positions on the surface.

At step 220, the hairs are combed to achieve desired, groomed, dry fur looks. A number of different combing processes may be used. In the present embodiment, however, static and animated combing processes are applied to the control hairs. The combination of static and animated combing provides a low computation cost but effective visual effect. In alternate embodiments, static or animated combing alone may be used and generate beneficial visual results. The combing process may be used on the same control hairs for different shots, to provide, for example, a groomed look versus a slightly messy look of the fur.

Figure 3B:
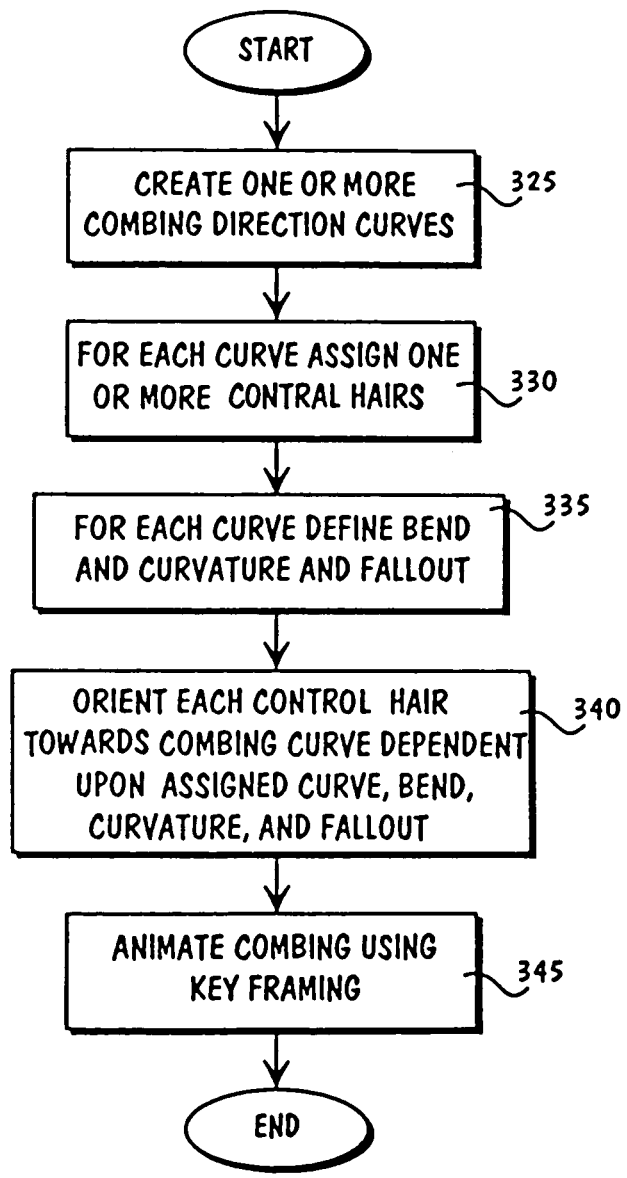
FIG. 3b is a simplified flow diagram illustrating one embodiment of static and animated combing processes.

One embodiment will be described with reference to FIG. 3*b*. In one embodiment, static combing is applied if the hairs do not "actively" move during an animation of the object, e.g., the animal. It should be noted that since each hair is expressed in a local coordinate system defined by the surface normal, du and dv at the root of the hair, statically combed hairs will "passively" move as the underlying surface is deformed or animated. Combing is achieved by specification of combing direction curves, degree of bending and curvature of the hair, as well as with a fall-off for each combing direction curve.

Figure 3C:
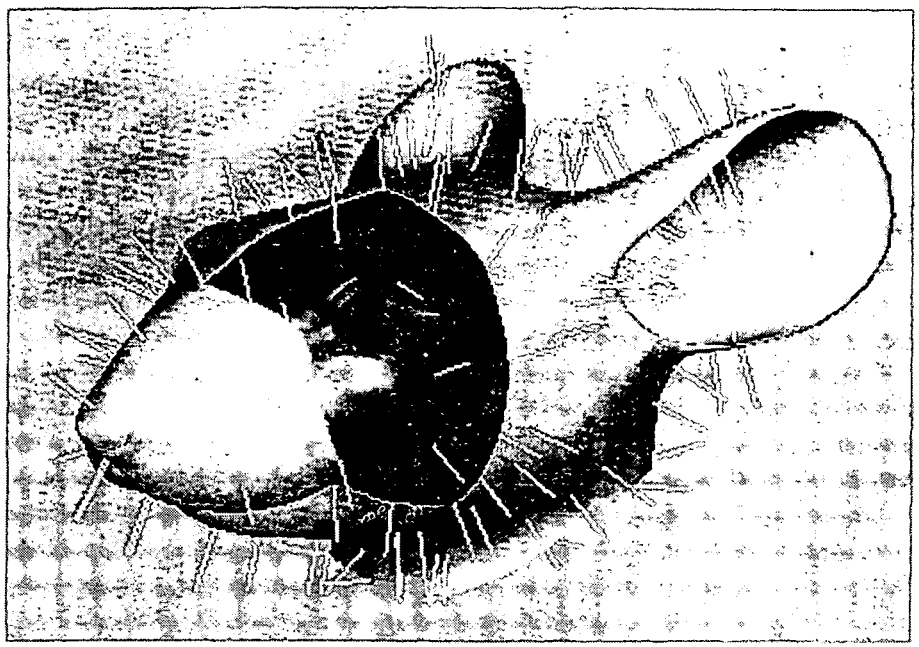
FIGS. 3c and 3d are examples that illustrate one embodiment of the combing processes.
Figure 3D:
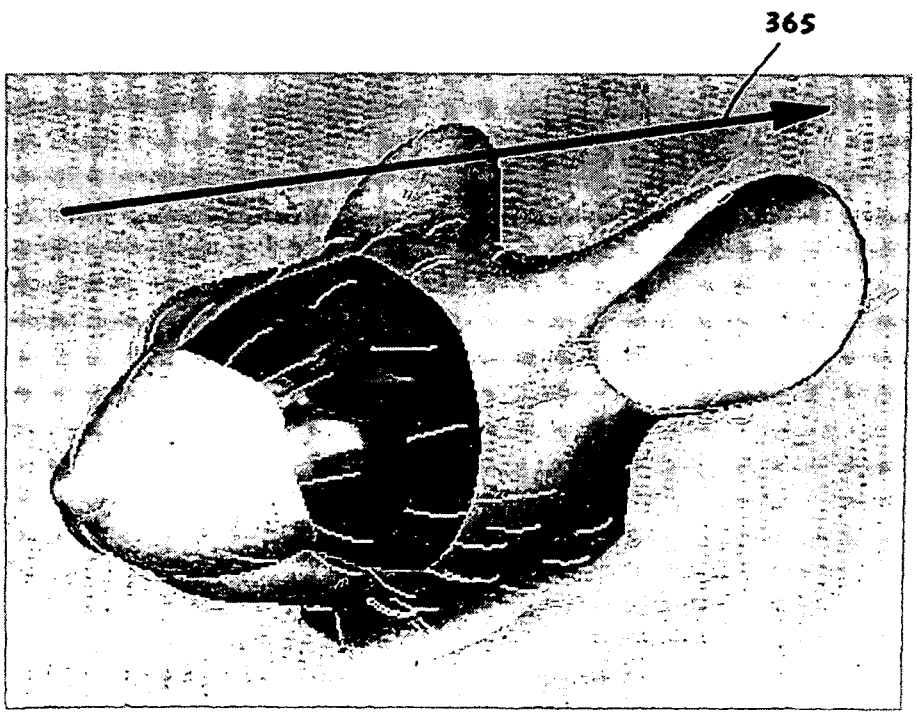

At step 325, one or more combing direction curves are created. These curves indicate the direction applicable control hairs are to be combed. An example is illustrated by FIGS. 3*c* and 3*d*. FIG. 3*c* shows a number of uncombed control hairs. FIG. 3*d* illustrates an exemplary combing direction curve 365 and its direction. The combed hairs as also illustrated in FIG. 3*d*.

FIG. 3*d* illustrates one combing direction curve. However, it is common to implement a number of different curves, each curve corresponding to a different area of the surface. Thus, at step 330, for each curve, one or more control hairs are assigned such that the assigned hairs are combed in accordance with the corresponding combing direction curve.

In addition, at step 335, for each curve, bend, curvature and fallout parameters are defined. The bend parameter defines how close the control hair is to the surface. The curvature parameter indicates the shape of the hair. For example, a curvature value of zero may indicate the hair is to be straight up and a maximum value (e.g., 1) may indicate the hair is bent on a tight arc from root to tip.

The fallout value indicates a region beyond which the combing direction curve decreases its influence the further away the control hair is from the curve. In some embodiments, the fallout region is specified to cover relatively large areas so all control hairs are equally affected and fallout does not occur. In other embodiments it is desirable to decrease the combing effect, the further the distance between the control hair and the combing direction curve.

At step 340, each control hair is processed according to the combing direction curve it is assigned to, and the bend, curvature and fallout parameters. The result of the process is illustrated by FIG. 3*d* in which the hairs are combed in the direction of the combing direction curve 365. In addition, the hairs are curved according to the bend and curvature parameters defined. In the present example the fallout parameter defines the entire surface such all hairs are equally affected and fallout is not present.

As noted above, animated combing may also be applied, step 345. Key framing, known in the art, is used to interpolate between combing changes specified at certain frames to proving smooth transitions between changes. Thus for example, bend curvature and fallout parameters may be specified to change at certain frames. The key framing process execution then transitions during the frames between the specified frame changes. This technique can be used to simulate a variety of conditions which affect the look of the hair, such as wind. Thus, the hairs can be animated by key framing the parameters and executing the combing calculations at each frame during playback.

The combing process may also include a simple hair/surface collision model process in which hairs that intersect with the underlying surface due to the combing process are pushed back up to be above the surface. Hairs may be rotated to intersect the underlying surface due to, for example, by setting the bend parameter to a large value.

The process includes an iterative algorithm that determines hair/surface intersections. For example, the process performs a line segment intersection check of successive control vertices of a curve (e.g., the NURBS curve) defining a control hair with the surface. If a control vertex c goes below the surface, the hair is rotated back towards the surface normal from the previous non-intersecting vertex just enough for c to clear the surface. The amount of rotation is large enough to cause the hair to rotate back up above the surface by a small amount specified by the application. Thus the vertices of the vector affected by the combing are rotated back towards the surface normal so that the vector is above the surface.

In an alternate embodiment, the combing may be animated by turning each control vertex of a control hair into a particle, and applying dynamic effects like gravity and external forces. Software, such as Maya, available by Alias|Wavefront, a division of Silicon Graphics, Inc., Toronto Canada, may be used to perform this function.

Once the control hairs are identified and processed (e.g., adjusted, combed), the final hairs for each patch are generated from the control hairs, step 223, FIG. 2. As noted above, in one embodiment the control hairs are first adjusted along surface boundaries. In an alternate embodiment, combing may be applied to control hairs alone or in conjunction with application of the surface boundary adjustment process.

Figure 5:
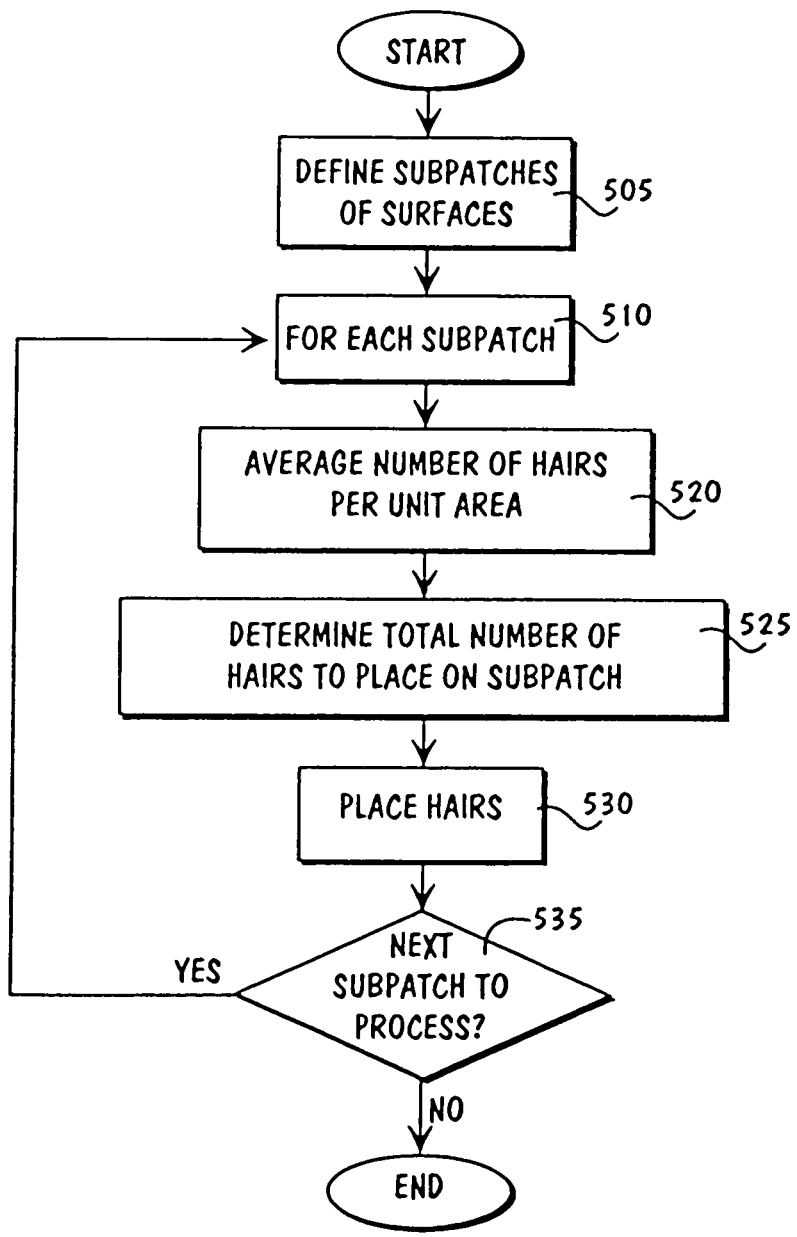
FIG. 5 is a flow chart illustrating one embodiment of a process for placing hairs.

One exemplary process for the placement of hairs on patches is illustrated by the flow chart of FIG. 5. In this embodiment, final hairs are generated from control hairs in two set steps. First, the static hair features are calculated, e.g., the placement (the u, v position) of the final hairs. This step may be performed once. The second set of steps may be performed for each frame in an animation and provide frame dependent hair features.

Figure 6:
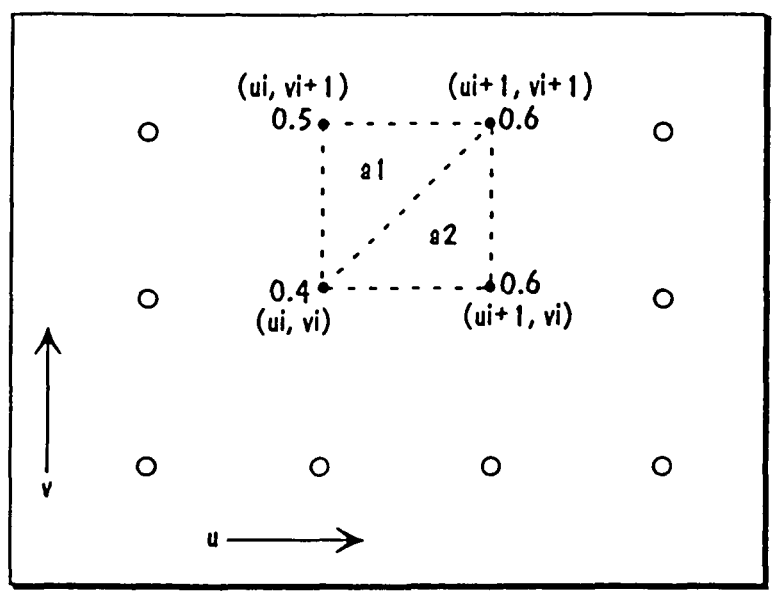
FIG. 6 illustrates one example of subpatches defined on the surface.

At step 505, subpatches are identified on a surface of the object on which the hairs are to be generated. FIG. 6 illustrates one embodiment for placing the final hairs on the surfaces defining the underlying skin. In the present embodiment, the root positions for each final hair are determined in terms of (u, v) parametric values of the surface. They are computed from an overall (global to all surfaces) density input value dmax (number of hairs per square unit area), and a set of normalized local density values (values range from 0 to 1; default value may be 1) per surface patch, arranged at a variable resolution grid of equally spaced points on the surface (for example, 128×128 points).

In one embodiment, the process attempts to make the number of hairs independent of the resolution of this grid and independent of the surface patch size to provide seamless density across surfaces of different scale. For purposes of discussion, it is assumed that the specified input density value (dmax) is 10 hairs/unit square area, and the local density values are arranged at equally spaced points on the surface as shown in FIG. 6 (e.g., 0.4, 0.5, 0.6, 0.6 hairs, respectively). These points define the subpatches of the surface to be processed, step 505, FIG. 5. As these equally spaced points are traversed, step 510, the area in (u, v) space between the neighboring points is approximated by the area defined by two polygons, more particularly, triangles (a1 and a2), and the number of hairs/square unit area for each triangle hair unit is averaged from the values at its vertices step 520. In one embodiment, this is determined according to the following: HairUnit=dmax*Vavg, where dmax represents the specified input density value and Vavg represents the average local density value for each triangle determined from values at its vertices. For the example defined, this results in 10*(0.4+0.5+0.6)/3=5 and 10*(0.4+0.6+0.6)/3=5.333 hairs/square unit area for the top left and bottom right triangle, respectively.

At step 525, the total number of hairs to place on the current subpatch is determined from the actual approximated area of the subpatch (a1 and a2) and the number of hairs per unit area. In one embodiment, the total number of hairs per unit area is determined according to the following: HairTotal=A*HairUnit, where A represents the actual approximated area of the subpatch. For example, if a value of 0.4 applies to area a1 and 0.3 applies to area a2, as assumed for purposes of discussion, 0.4*5+0.3*5.333=3.5999 is the total number of hairs to place in subpatch defined by (ui, vi), (ui, vi+1), (ui+1, vi+1), (ui+1, vi).

At step 530, the final hairs are placed. Since it is preferable not to place fractional hairs, either 3 or 4 hairs are placed depending on whether a uniformly generated random number in [0, 1] is bigger or smaller than the fractional part (0.5999). The 3 or 4 control hairs are randomly placed in u [ui, ui+1] and randomly in v [vi, vi+1]. The process then proceeds back to step 515 to the subpatch defined by the next four equally spaced points.

Figure 7A:
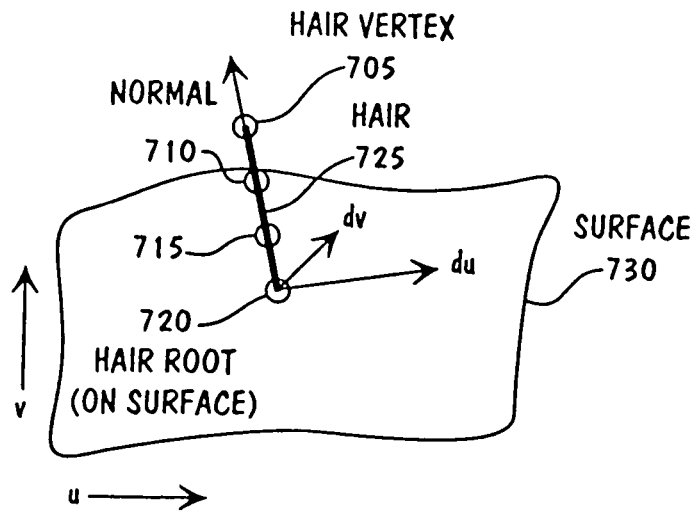
FIG. 7a illustrates an example of control vertices of one control hair.

Each final hair contains a number of control vertices. The root position (first control vertex) of each control hair is specified in terms of a (u,v) value of the underlying surface. The remaining control vertices of each hair are defined in a known local coordinate system with origins specified at the hair root position, and axes in the direction of the surface normal, du, dv. In one embodiment, each hair is oriented along the surface normal and the coordinates of the control vertices are generated by subdividing the length of each hair into n−1 equal parts, where n is the number of control vertices/hair. One example is illustrated in FIG. 7*a*, where a hair 725 is defined on surface 730 with n=4. The root is vertex 720 and the remaining vertices are 705, 710 and 715.

Once the root position is calculated the enclosing control hairs (in one embodiment three) for each final hair are determined. In one embodiment, a 2-dimensional Delaunay triangulation (know in the art and therefore not further discussed herein) is constructed of the (u,v) positions of the control hairs for each surface patch. This triangulation was chosen because it creates "well-proportioned" triangles, by minimizing the circumcircle and maximizing the minimal angles of the triangles. Once the Delaunay triangulation is constructed, it is determined which triangle each final hair falls into. The indices of the three control hairs which form the particular triangle are assigned to the hair that falls into that triangle.

Figure 7B:
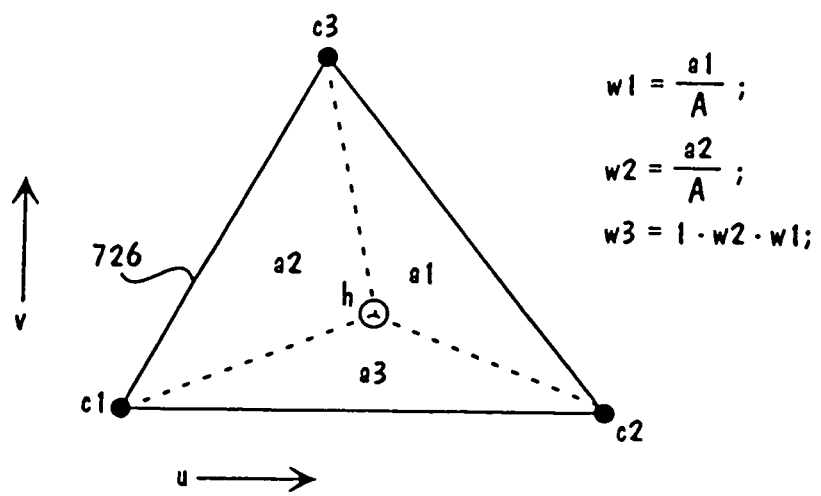
FIG. 7b illustrates an example for calculating control hair weights.

The weights (w1, w2, w3) which each of the three control hairs (c1, c2, c3) has on the final hair (h) are then calculated. This may be done using barycentric coordinates (know in the art and not further discussed here), and is illustrated in FIG. 7b, where "A" represents the area of triangle 726 (c1, c2, c3). These weights are used for interpolating the final hairs from the control hairs as explained below.

Figure 7C:
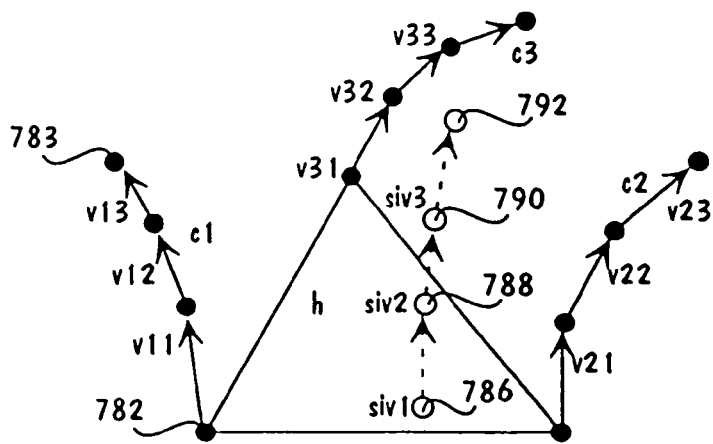
FIG. 7c illustrates an example an interpolation process used to calculate orientations of final hairs in accordance with the teachings of one embodiment of the present invention.
Figure 7D:
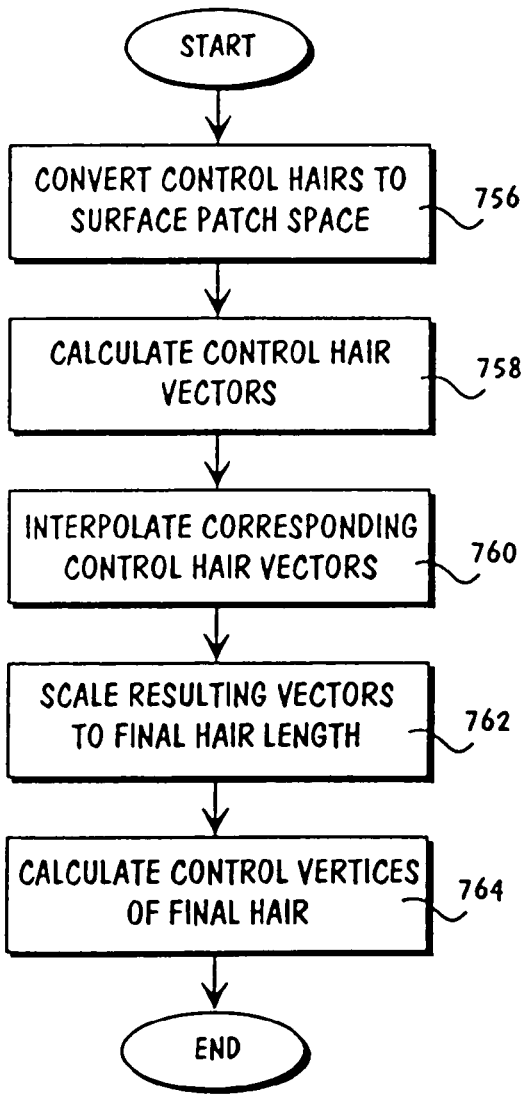
FIG. 7d is a simplified flow diagram of one embodiment for the calculation of the orientation of final hairs.

The above information of each final hair (i.e., the (u,v) position, the 3 enclosing control hairs, and the weights of each control hair) may be generated only once for an object in animation. This information is referred to herein as the static information. In contrast, the calculation of the orientation of each final hair may be done at each frame of an animation. This orientation is determined from the orientation of the control hairs and their corresponding weights by an interpolation process as explained with reference to FIGS. 7c and 7d.

For each final hair (h) at step 756, the corresponding three control hairs (c1, c2, c3) are converted into a surface patch space (in one embodiment, the patch coordinate system) utilized. At step 758, control hair vectors, (e.g., v11, v12, v13), between control vertices are calculated (e.g., 782, 783). A variety of techniques may be used to calculate the control hair vectors; in one embodiment, the vectors are equally distributed between control vertices. The control hair vectors are then normalized (e.g., nv11, nv12, nv13). At step 760 the corresponding control hair vectors of the three control hairs are interpolated and multiplied by the three determined weights that were calculated for the final hair. In one embodiment, for example, one control hair vector is determined according to the following equation:

$$iv1 = nv11*w1 + nv21*w2 + nv31*w3;$$

wherein iv1 represents the interpolated, weighted control hair vector representation of the final hair, nv11, nv21 and nv31 represent normalized control vectors and w1, w2 and w3 represent the corresponding weights for the normalized control vectors. At step 762, the resulting vectors are scaled to a final hair length (siv1, siv2, siv3). Once the scaled vectors are determined, at step 764 the control vertices (786, 788, 790, 792) of the final hair are calculated from the scaled vectors.

As illustrated in FIG. 2, steps 225, 230, 235 and 245 may be optional and may not be necessary to produce a groomed, dry fur coat. Steps 225, and 230 are applied for the generation of wet fur. Clumping of hairs can occur when the fur gets wet due to the surface tension or cohesion of water. The effect is that the tips of neighboring hairs (a bunch of hairs) tend to gravitate towards the same point, creating a kind of cone-shaped "super-hair", or circular clump. As will be described below, step 225 is executed for static area clumping that generates hair clumps in fixed predefined areas. Step 230 is executed for animated area clumping, that is, when clumping areas move on the model, for example, to simulate spouts of water or raindrops hitting the fur and making it increasingly wet. In both cases, parameters which can be animated are provided to achieve various degrees of dry-to-wet fur looks. Step 235 is applied to generate dry fur clumping or breaking.

According to a particular application all or some of the steps 225, 230 and 235 may be executed. In addition, the steps 225, 230 and 235 may be prioritized according to an application such that a hair adjusted in a higher priority step is not adjusted in the other steps. Alternately, the effects may be cumulative or selectively cumulative depending upon a particular application.

At step 225 static area clumping is performed. One embodiment of this process is described with reference to FIG. 8. For purposes of discussion, the center hair of each clump is referred to as the clump-center hair, and all the other member hairs of that clump, which are attracted to this clump center hair, are referred to herein as clump hairs.

In one embodiment there are four clumping input parameters: clump-density, clump-size, clump-percent and clump-rate. Similar to the hair-density parameter, clump-density specifies how many clumps should be generated per square area. The process described herein translates the clump density into an actual number of clumps defined by clump-center hairs, the number of clump center hairs depending on the size of each surface patch. As a result, some of the existing hairs are turned into clump-center hairs.

Clump-size defines the area of a clump. In one embodiment, the clump size is defined in world space, a space that a user typically references with respect to a size of an object. In one embodiment, clump density takes priority over clump size, such that if there are many clumps and most of them overlap, the clump size cannot be maintained, since a clump hair can be a member of only one clump. If both clump density and size are small, many hairs between the clumps will not be clumped.

Figure 8:
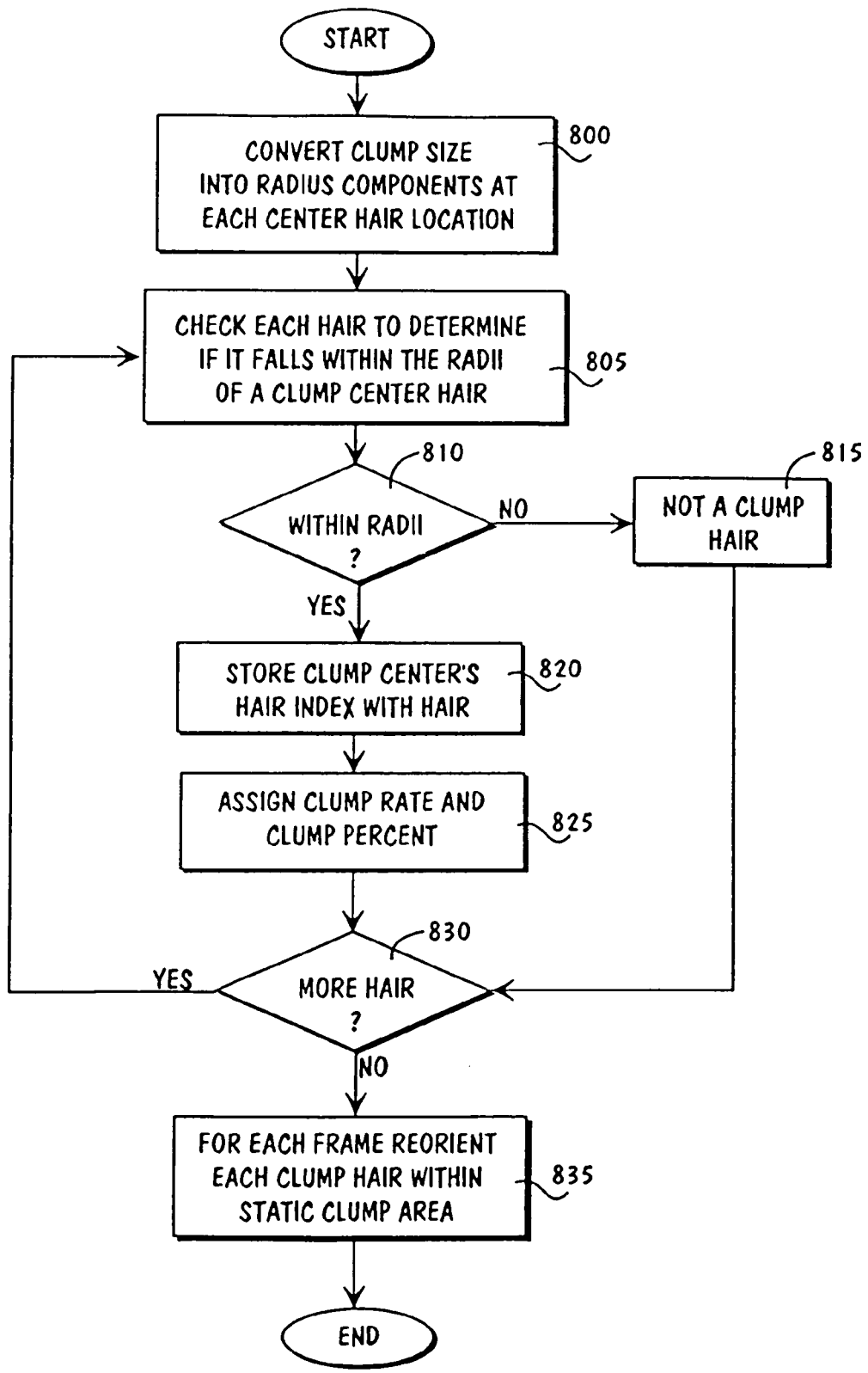
FIG. 8 is a flow chart illustrating one embodiment of a process to perform static clumping.

Referring to FIG. 8, to determine clump membership of each final hair (i.e., what clump each hair belongs to, if any), the clump of the specified clump-size is converted into u-radius and v-radius components in parametric surface space at each clump-center hair location, step 800. Each hair is evaluated at steps 805, 810 to determine whether it falls within the u, v radius components of a corresponding clump-center hair. If the hair is not within the u, v radius components, the hair is not a clump hair, step 815 and the process continues, step 830, with the next hair. If the hair is within the u, v radius components, at step 820 the clump-center hair's index is referenced with the hair. In addition, a clump rate and clump percent is assigned, step 825.

A number of variations are contemplated. A clump-size noise parameter may be introduced to produce random variations in the size of the clumps. Feature (texture) maps for a clump-size can be created and specified by the user, one per surface patch, to provide local control of the radii used at steps 805, 810. In this embodiment, the global clump-size input parameter is multiplied for a particular clump (clump center hair) at (u,v) on a surface patch with the corresponding normalized (s, t) value in the clump-size feature map for that surface. Also, a static clump-area feature map can be provided to limit clumping to specified areas on surface patches rather than the whole model.

In one embodiment a clump-percent and clump-rate value is assigned to each clump hair (step 825). In one embodiment, the values for both range between [0,1], and are used subsequently to reorient clump hairs, step 835, as described below.

Clump-percent specifies the degree of clumping for a clump hair. For example, a value of zero indicates that the hair is not clumped at all, i.e., it is like a "dry" hair. A value of one indicates that the hair is fully attracted to its clump-center hair, i.e., the tip of the hair (its distant control vertex) is in the same location as the tip of the clump-center hair.

Figure 9:
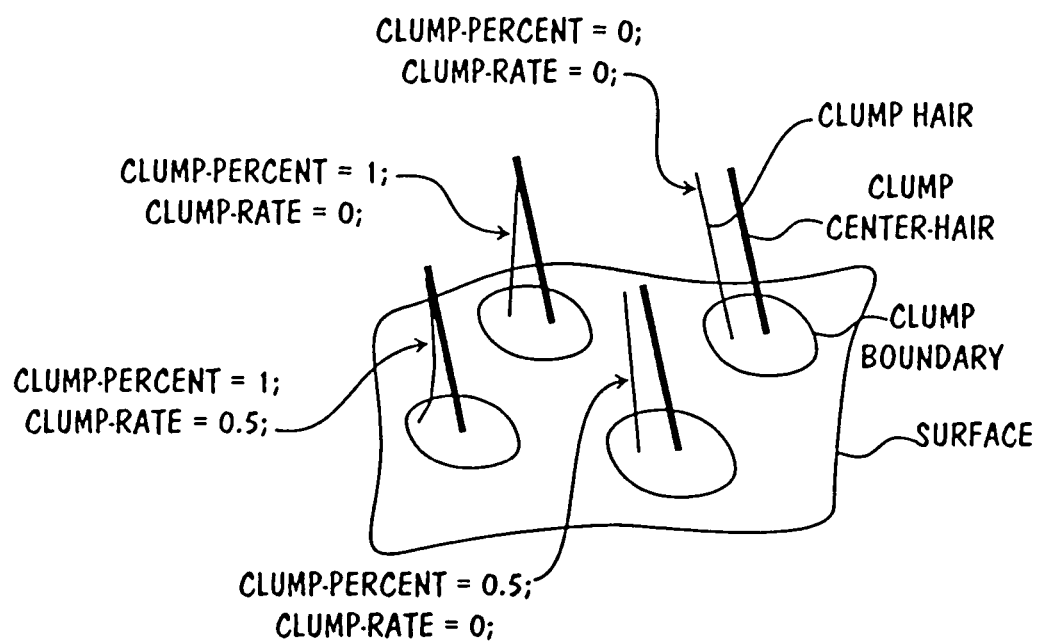
FIG. 9 illustrates examples of different clump-percent and clump-rate values.

Clump-rate defines how tightly a clump hair clumps with its corresponding clump-center hair. For example, a value of zero indicates that the clump hair is linearly increasingly attracted to its clump-center hair, from the root to the tip. A clump-rate value closer to one indicates that the hair's control vertices closer to the root are proportionally more attracted to corresponding clump-center hair vertices than those closer to the tip, which results in tighter clumps. Examples of different values for clump-percent and clump-rate are given in FIG. 9.

At step 835, the control vertices (except the root vertex) of each clump hair are reoriented towards corresponding clump-center hair vertices from the clump hair's dry, combed position determined at steps 200, 210, 215, 220, and 223.

In one embodiment, this process is performed at each frame. In one embodiment, the default value for number of control vertices (CVs) is 3 (4 minus the root vertex), and the index for the current control vertex i ranges from 1-3. In one embodiment, the reorientation is determined as follows: clumpHairCV[i]=clumpHairCV[i]+delta*(clumpCenterHairCV[i]−clumpHairCV[i]) delta=clumpPercent*(fract+clumpRate*(1−fract)); where fract=i/number OfCVs; clumpHairCV[i] represents a clump hair vertex; clumpCenterHairCV[i] represents a corresponding clump center hair vertex; i represents an index to a current control vertex; number of CVs represents the number of control vertices of a clump hair; clumpPercent represents clump-percent; and clumpRate represents the clump-rate.

Both clump-percent and clump-rate parameters can be locally controlled via feature maps similar to the feature maps described above with respect to clump-size. Both values can also be animated or changed over time to provide continuous control for dry-to-wet-to-dry fur looks. This is illustrated by FIGS. 10a, 10b, 10c and 10d which illustrate four frames from an animated clump-percent and clump-rate sequence. In the image of FIG. 10a the clump-percent and clump-rate are both zero and may represent dry, combed hair. In the image of FIG. 10b, clump-percent is 0.7 and clump-rate is 0, which results in a slightly wet look. In the image of FIG. 10c, clump-percent is 1.0 and clump-rate is 0.3, which results in a wet look. In the image of FIG. 10d, clump-percent and clump-rate are both 1.0, which produces a very wet look.

Animated area clumping is desirable to simulate spouts of water or raindrops hitting the fur and making it increasingly wet. At step 230, FIG. 2, animated clumping is performed. In one embodiment, the animated clumping areas are defined in an animation system.

Figure 11:
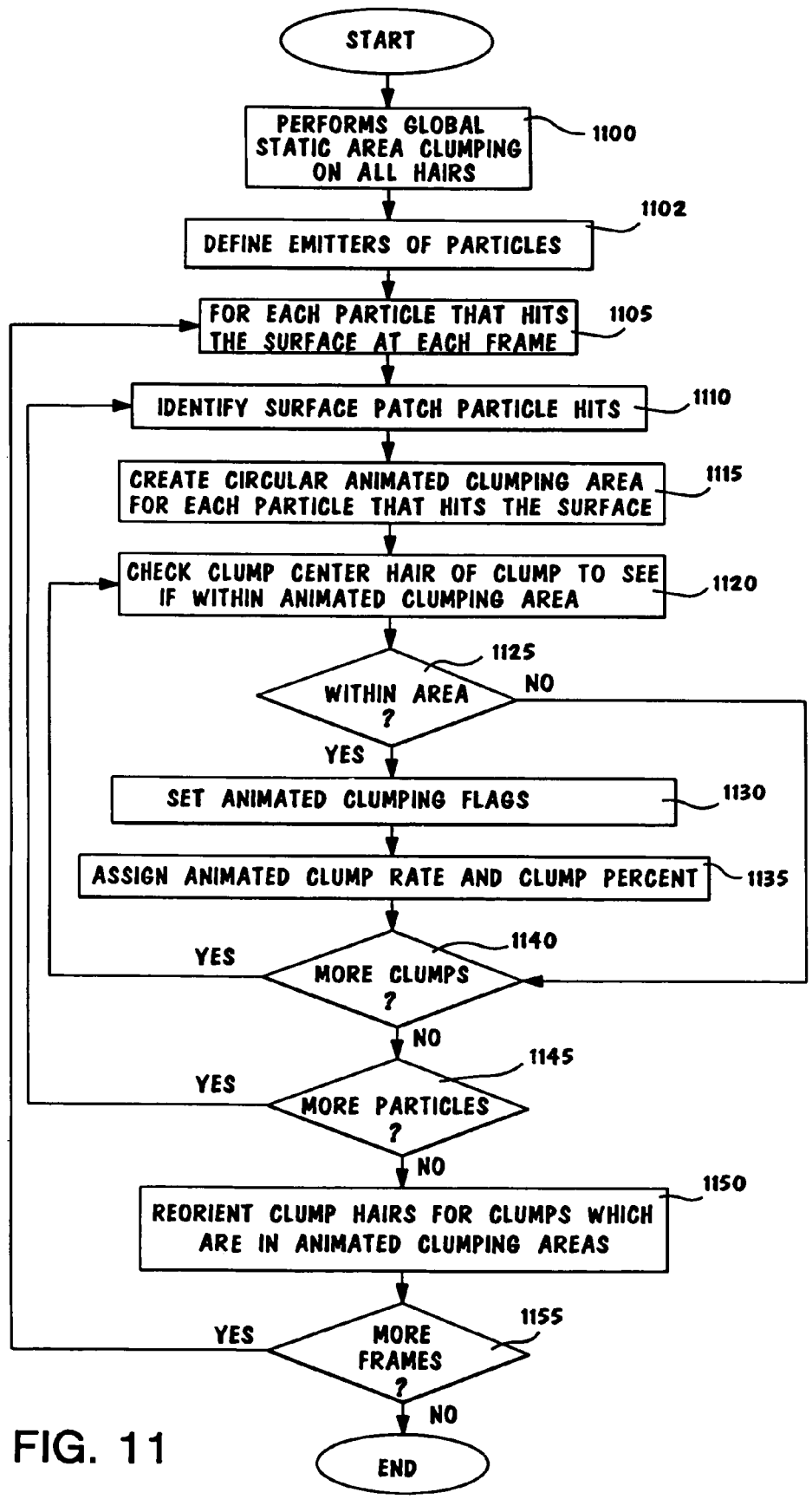
FIG. 11 is a flow chart illustrating one embodiment of a process for animated area clumping.

One embodiment of the process is described with reference to FIG. 11. In one embodiment, clumping areas are defined by particles hitting surface patches. Other embodiments may use alternate techniques for generating animated clumping areas. At step 1100 a global static area clumping process is performed on all hairs. This step identifies clumping regions and corresponding clump center hairs and clump hairs. As explained below this information is used in the animated clumping process. In one embodiment, the global static area clumping used is that described above for static area clumping.

At step 1102, one or more emitters that generate the particles are defined. The use of emitters to generate particles is known in the art and will not be discussed in detail herein. In one embodiment, the emitters define the rate generated and spread of the particles across a surface.

At step 1105, at each frame for each particle generated that hits the surface, the surface patch the particle hits is identified, step 1110. In one embodiment, particles generated in prior frames are carried through subsequent frames such that the particles are cumulative.

For each particle that hits a surface patch, including those particles generated in prior frames, a circular animated clumping area is created, step 1115, on the patch at that (u,v) location, with clump-percent, clump-rate, and animated clumping area radius determined by a creation expression executed at the frame where the particle hits the surface so that when a particle hits the surface at that time (i.e., at the frame), the clump-percent may be set to zero and the radius may be defined to a specified value perhaps adjusted by a random noise value. Thus, the expression may be defined to provide the desired "wetness" effect.

The radius of the circular clumping area defined is converted into a corresponding u-radius and v-radius similar to the clump size discussed above. Runtime expressions executed at each frame define clump-percent and clump-rate, thus determining how quickly and how much the fur "gets" wet. For example, one runtime expression may be: MIN(FrameNumber*0.1, 1) such that as the frame number increases, the hair appears increasingly wet.

Each clump center hair of a clump (determined at step 1100) is then evaluated to determine if it falls within the animated clumping area, step 1120. To determine whether a clump falls within an animated clumping area, at each frame it is checked as to whether the (u,v) distance between the clump-center hair of the clump and the center of the animated clumping area is within the u, v) radius parameters of the animated clumping area. For clumps that are located in overlapping animated clumping areas, the values for clump-percent and clump-rate are added resulting in the generation of wetter fur.

If the clump center hair is within the animated clumping area, step 1125, the corresponding clump is flagged with an animated clumping flag such that the clump hairs are subsequently reoriented to reflect the animated clumping effect. Alternately, each clump hair of the clump may have an animated clumping flag which is set if the corresponding clump center hair is determined to be within an animated clumping area. In addition, an animated clump-rate value and an animated clump-percent value are assigned to the clump hairs that are identified to be within an animated clumping area in accordance with a runtime expression. In one embodiment, the values for clump-percent and clump-rate for each clump within an animated clumping area are replaced with the corresponding values for the animated clumping area at each frame. As animated clumping areas may be much bigger than a clump, an animated clumping area may contain several individual clumps. Each clump is evaluated, step 1140, for each particle, step 1145.

It should be noted that animated clumping areas could straddle surface patch boundaries. For example, the center of an animated clumping area may be located on one surface patch, but the area may be located on one or more other patches. Since the animated clumping areas are typically defined and therefore associated with the surface which contains the center of the animated clumping area, i.e., the position where the particle hit, portions of a clumping area straddling neighboring patches may be overlooked. This could lead to discontinuities in clumping of the final fur.

In one embodiment, this potential problem is addressed. Whenever a new particle hits a surface and the (u,v) radii exceed the boundaries of that surface; an additional (u,v) center and (u,v) radii is generated for the animated clumping areas affecting neighboring patches. Thus, for example, if the clumping area covers portions of two neighboring patches, a corresponding (u.v) center and radii are generated for each neighboring patch to provide additional animated clumping areas for evaluation at steps 1120-1140

At step 1150, for each frame, the clump hairs of clumps that are within the animated clumping areas are reoriented. Thus, clump hairs are selectively adjusted if they are within an animated clumping area. In one embodiment, clumping is restricted to the animated clumping areas at each frame, so that final hairs of clumps outside the animated clumping areas are normally produced as "dry" hairs.

At step 1155, if more frames are to be processed, the process continues again at step 1105. Thus the animated clumping process is performed across multiple frames to provide animated effects.

Referring back to FIG. 2, step 235 may be applied to generate the effect of hair breaking or dry fur clumping by breaking up the groomed fur coat along certain lines (fur tracks or break line) on the underlying skin (surfaces). As described below, this process may include two kinds of hair breaking: symmetric and one-sided. In symmetric breaking, hairs on both sides of a fur-track "break" towards that track, whereas in one-sided breaking, hairs on one side of the track break away from the track.

In one embodiment, fur tracks are specified as curves on surfaces in an animation system. Each track has a radius, break-percent and break-rate for symmetric and one-sided breaking, and an additional break-vector for one sided breaking. The final information generated is output into breaking files that are subsequently accessed to reorient the affected hairs.

Figure 12A:
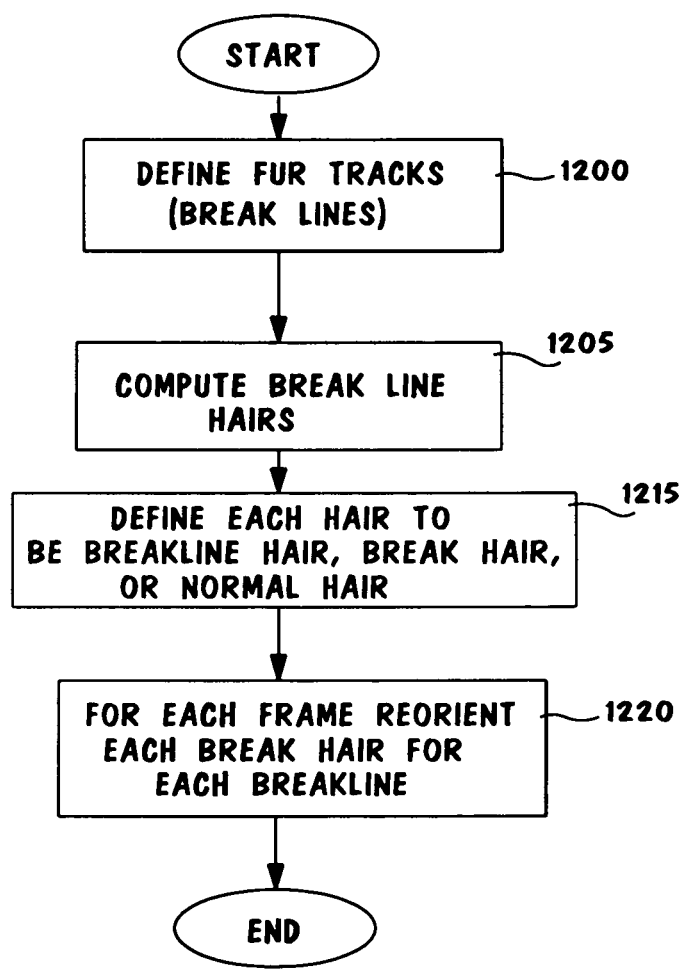
FIG. 12a is a flow chart illustrating one embodiment of a process for hair breaking.

One embodiment of the hair breaking technique is illustrated by FIG. 12*a*. At step 1200 the fur tracks are defined. The fur tracks may be defined similar to clumps by defining a (u,v) break radii. At step 1205 the break line hairs (hairs which lie on or are very close to the fur-track curve defined by the curve defined for the fur track) are computed. Using the break line hairs and break radii, at steps 1215, 1220, each hair is evaluated to determine whether the hair lies within the (u,v) break radii on both sides of the break line hairs in case of symmetric breaking, or to one side specified by the break vector (the break vector side) in case of one-sided breaking. For each hair within the space specified by the radii, referred to herein as a break hair, the corresponding break line hair (hair on the fur track) is then determined as the one closest to it. The hairs are labeled as break line hairs, break hairs with indices to their corresponding break line hairs, or normal hairs that do not reside within the areas specified by the break.

Figure 12B:
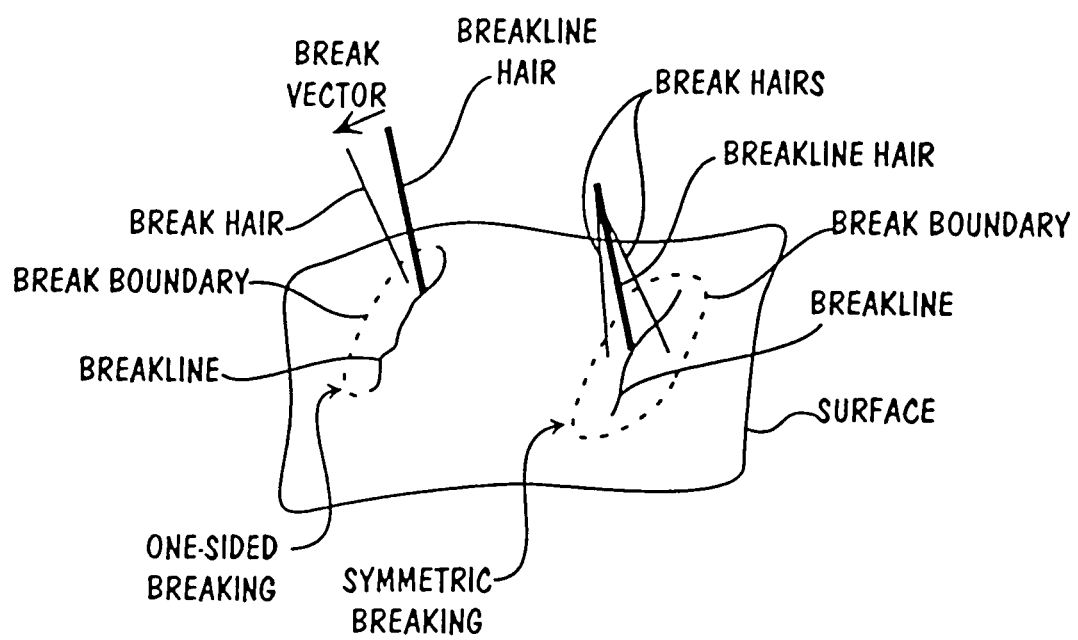
FIG. 12b illustrates examples of symmetric and one-sided breaking of hairs.

It should be noted that for instances of one-sided breaking, each break hair is now reoriented "away" from its corresponding break line hair in the direction of the break-vector, rather than "towards" the break line hair. Examples of symmetric and one-sided breaking are shown in FIG. 12*b*.

The break hairs are reoriented with respect to their corresponding break line hairs, step 237. For symmetric breaking, this process is analogous to the process performed for clump hairs discussed earlier. However, for break hairs, the break-percent and break-rate values are used in place of the clump-percent and clump-rate used for clump hairs. For one-sided breaking, break hairs are repelled, as opposed to attracted to the break-line hairs according to the break-percent and break-rate parameters.

Figure 12C:
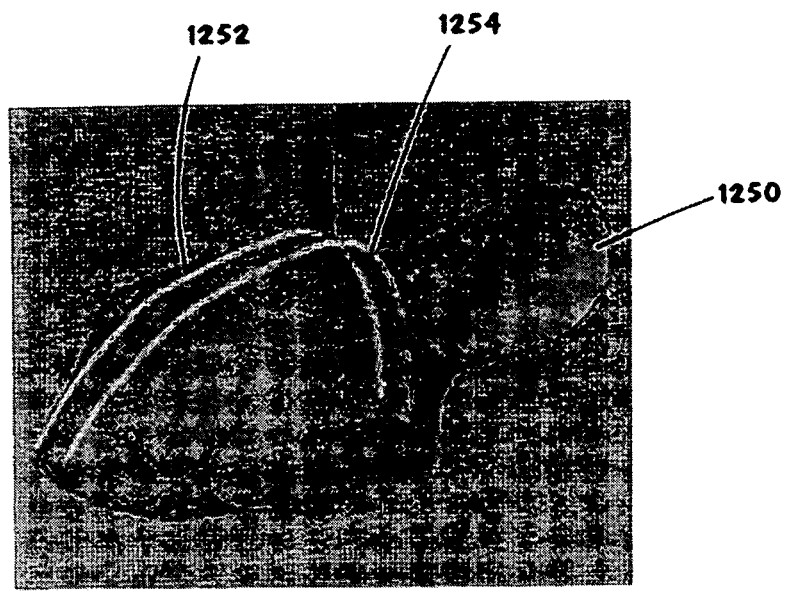
FIGS. 12c, 12d, 12e, and 12f illustrate examples of breaking effects.
Figure 12D:
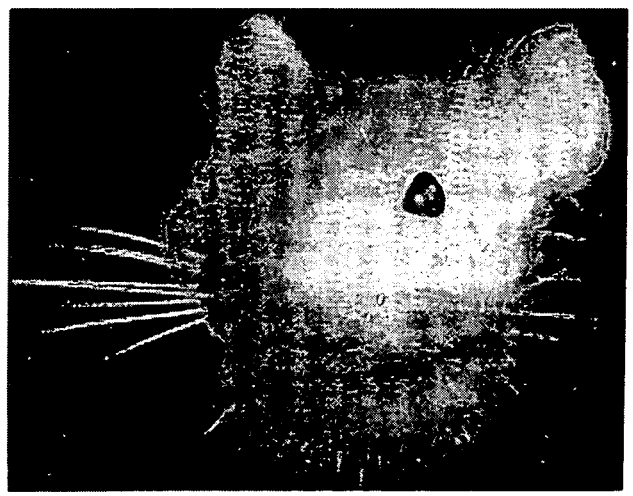
Figure 12E:
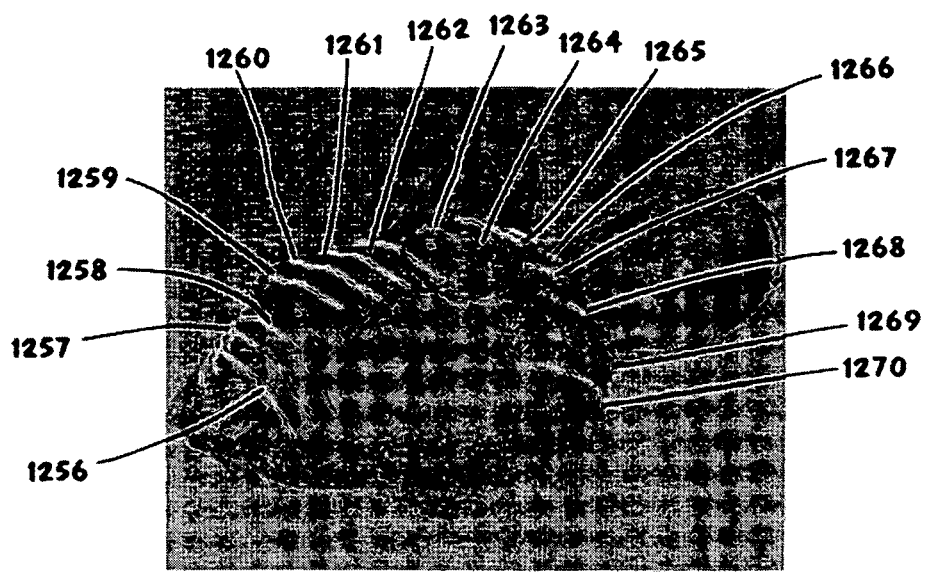
Figure 12F:
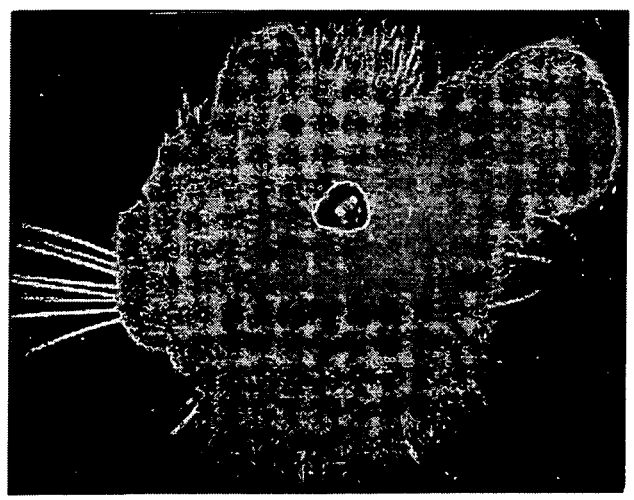

The breaking effect is illustrated by FIGS. 12*c*, 12*d* 12*e* and 12*f*. FIG. 12*c* illustrates an object 1250 having break line hairs 1252, 1254. FIG. 12*d* shows the resultant effect on the object for symmetric breaking. FIGS. 12*e* and 12*f* illustrate one-sided breaking along break line hairs 1256-1270.

Figure 13A:
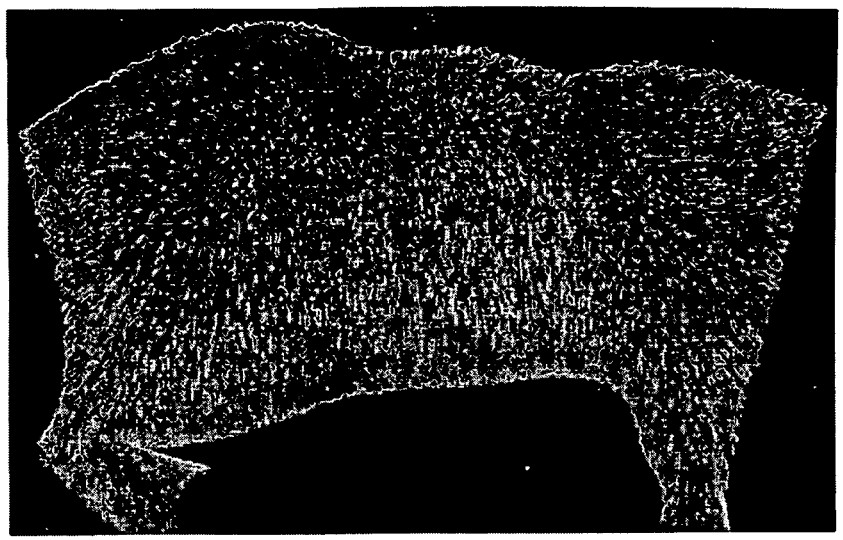
FIGS. 13a, 13b, and 13c illustrate the visual effects of undercoat and overcoat.
Figure 13B:
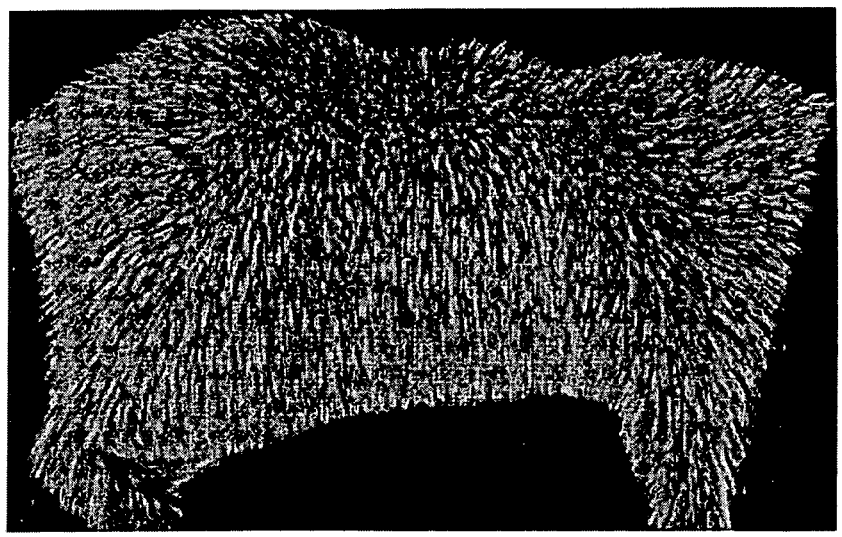
Figure 13C:
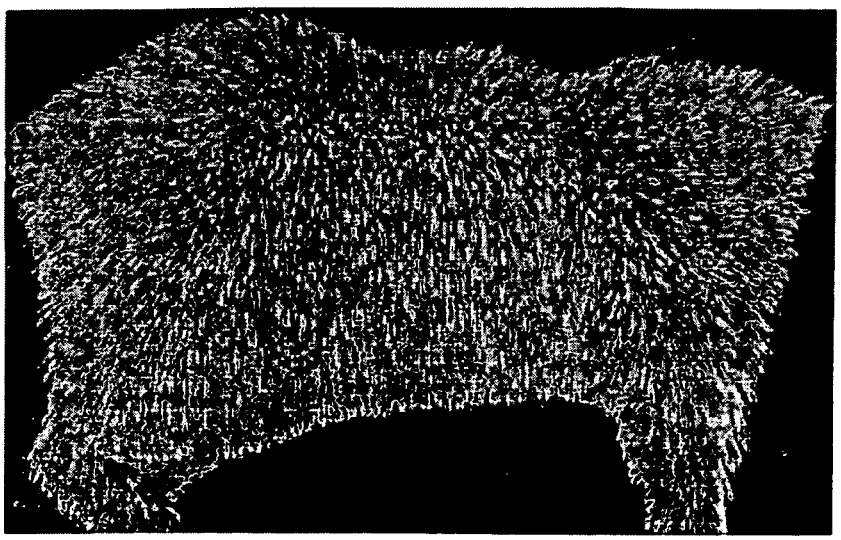

At step 245, FIG. 2, a decision is made as to whether multiple passes of the process are to be performed. The coat of most furred animals is composed of a fuzzier, thinner shorter layer of hairs called undercoat, plus an overcoat of longer and thicker hairs. Step 245 illustrates the capability to perform a two-(or multiple)-pass process, whereby steps 210, 215, 220 and 223 (and optionally 225, 230, and 235) are executed more than once, producing a different set of hairs at each pass. These sets or layers are then processed and combined at render-time (step 250). The effects can be seen by reference to FIGS. 13*a*, 13*b* and 13*c*. FIG. 13*a* is a representation of an undercoat generated in accordance with the teaching of the present invention. FIG. 13*b* represents a representation of the overcoat and FIG. 13*c* represents the combined image consisting of the undercoat and overcoat.

As illustrated by step 250, the clumped hairs represented by their control vertices are rendered into a series of two-dimensional images to create lifelike dry and wet hair looks. In one embodiment, the process functions to project a three-dimensional hair geometry onto a two-dimensional image plane from the perspective of a particular point of view.

In order to render large amounts of hair quickly and efficiently, the geometric model of each hair may be kept simple. As explained above, a hair is represented by a parametric curve having a determined number of control vertices (in one embodiment, the default is four).

In one embodiment, the process employs known rendering technology to produce the hairs described by the corresponding control vertices. In an alternate embodiment customized modules are added to realistically "shade" the hairs. This may be accomplished by assigning an intensity of color at each point along or on a hair, wherein points along a hair may be defined as the pixels which compose the hair.

During the rendering of the hairs, a width is added for each hair to transform it into a narrow ribbon that is always oriented towards the camera or view point. The shading process properly shades these ribbon primitives to more realistically present them as thin hairs.

Figure 14:
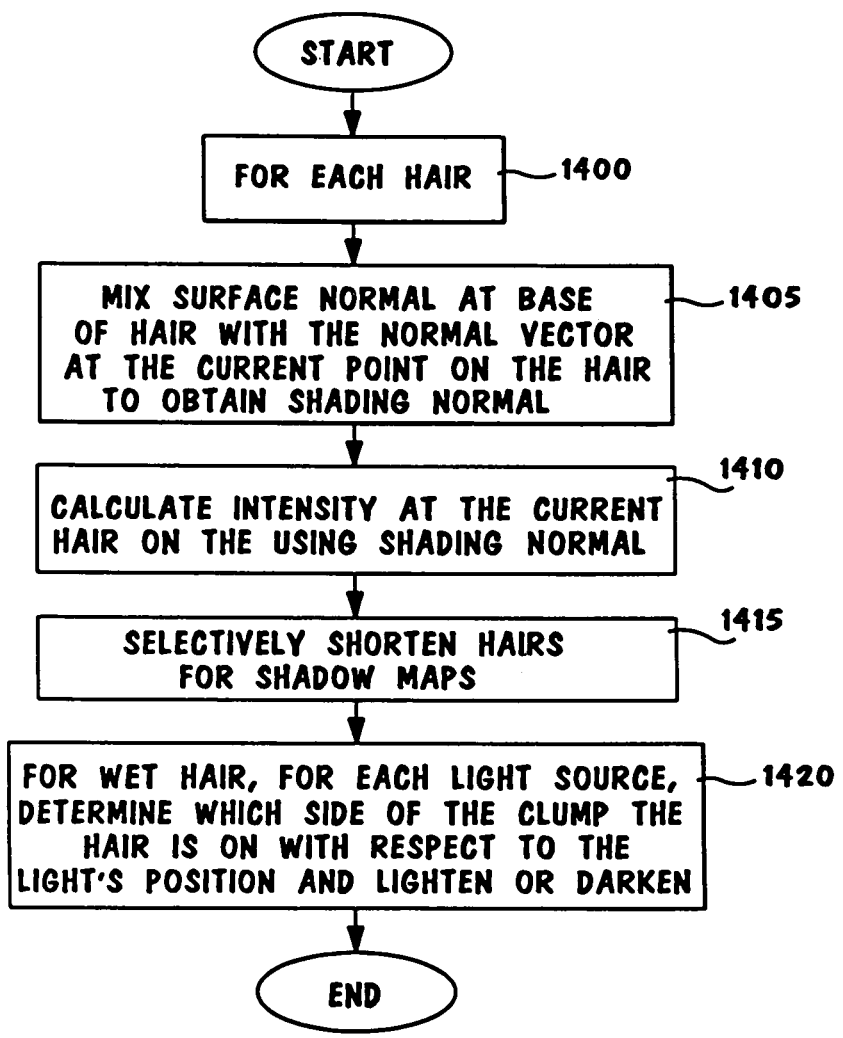
FIG. 14 is a flow chart illustrating one embodiment of a shading process.

One embodiment of the shading process is set forth in the flow chart of FIG. 14. At step 1400, each hair is processed. At step 1405, for each hair, the surface normal at the base of the hair is mixed with the normal vector at the current point on the hair in order to obtain a shading normal at the current point on the hair. In one embodiment, the hairs are rendered as a series of points or pixels on a display. Thus, the current point is one of the pixels representing a hair.

The shading process may be applied at multiple points along the hair. In one embodiment, the amount with which each of these vectors contributes to the mix is based on the angle between the tangent vector at the current point on the hair, and the surface normal vector at the base of the hair. The smaller this angle, the more the surface normal contributes to the shading normal.

At step 1410 the intensity of the hair at the current point on the hair is determined using the shading normal at that point. In one embodiment, a Lambertian model is used to calculate these intensities. Using this approach provides the benefit of allowing the user to light the underlying skin surface and receive predictable results when fur is added. This approach also accounts for shading differences between individual hairs, and differences in shading along the length of each hair.

In order to obtain realistic shadows on the fur coat, shadow maps are used. The use of shadow maps is known in the art and will not be discussed further herein. However, incorporating the hair into the shadow maps may generate several unwanted side effects. One problem is that of dark streaking on brightly lit fur because of the fur self-shadowing. Dark streaks look wrong on brightly lit fur because normally light bounces off the skin and hair to prevent dark shadows on brightly lit fur.

In order to minimize the dark streaking effects, in one embodiment, the hairs for the shadow maps are shortened based on certain criteria, step 1415. For example, the length and density of the hair may dictate the percentage to shorten the hair. By selectively shortening hairs for the shadow maps, the hair self-shadowing effect is minimized while still producing a broken up shadow on the terminator lines for lights falling on the fur.

Back lighting is achieved in a similar fashion using a shadow map for each light located behind the furred object, and again shortening the hair on the basis of density and length in the shadow map render process. In one embodiment, a lighting model for hairs also allows each light to control its diffuse fall-off angles. Thus, lights directly behind the furred object can wrap around the object. Using these lighting controls together with shadow maps reasonable back lighting effects are achieved.

In one embodiment, the shading for clumped hairs is modified. In one embodiment, two aspects of the hair shading may be modified. First, the amount of specular on the fur is increased. Second, clumping is accounted for in the shading model. Geometrically, as explained earlier, fur is modeled in clumps to simulate what actually happens when fur gets wet. In the shading model, for each hair and for each light, the side of the clump the hair is on with respect to the light's position is determined, and the hair is either darkened or brightened based on the side the hair is on. Thus, hairs on the side of a clump facing the light are brighter than hairs on a clump facing away from the light.

The invention has been described in conjunction with the preferred embodiment. It is evident that numerous alternatives, modifications, variations and uses will be apparent to those skilled in the art in light of the foregoing description.

What is claimed is:

1. A method implemented by a computer system having a memory and a processor for the digital creation of hair effects comprising:
   constructing a seam that defines a boundary between at least two adjacently connected surface patches, wherein each of the adjacently connected surface patches is a distinct parametric surface and wherein at least one control hair is placed onto each of the adjacently connected surface patches;
   examining each control hair on the at least two adjacently connected surface patches;
   identifying a boundary hair from the examined control hairs of a first surface patch of the at least two adjacently connected surface patches, wherein the boundary hair is one of the examined control hairs that lies on the boundary;
   checking for a corresponding boundary hair from the examined control hairs of neighboring surface patches of the at least two adjacently connected surface patches, wherein the corresponding boundary hair is within a predetermined distance from the boundary hair;
   aligning the boundary hair of the first surface patch with the corresponding boundary hair of the neighboring surface patches, wherein the aligning is performed in response to locating the corresponding boundary hair;
   modifying the boundary hair, the corresponding boundary hair, and the examined control hairs to provide a visual groomed effect, wherein the modifying includes:
   creating at least one combing direction curve;
   assigning at least one of the boundary hair, the corresponding boundary hair, and the examined control hairs to the combing direction curve, wherein the combing direction curve indicates the direction in which assigned control hairs are to be combed;
   defining parameter values comprising bend, curvature, and fall-off parameter values for the combing direction curve, wherein the bend parameter value defines the closeness to the surface, the curvature parameter defines shape, and the fall-off parameter defines the degree of effect of the combing direction curve to the assigned control hairs;
   processing the assigned control hairs based upon the combing direction curve they are assigned to and based upon the bend, curvature, and fall-off parameter values;
   generating other hairs within the area based on the assigned control hair, the other hairs having approximately the same orientation as the assigned control hair; and
   displaying the hair on a display device, wherein the steps of constructing, examining, identifying, checking, aligning, modifying, creating, assigning, defining, processing, generating and displaying are performed by the computer system.

2. The method as set forth in claim 1, wherein assigning at least one of the boundary hair, the corresponding boundary hair, and the examined control hairs further comprises identifying at least one of the boundary hair, the corresponding boundary hair, and the examined control hairs including at least one control vertex located below an underlying surface.

3. The method as set forth in claim 1, wherein processing the assigned control hair towards the combing direction curve further comprises rotating the assigned control hair above an underlying surface.

4. The method as set forth in claim 1, wherein the aligning is performed in response to determining the absence of the corresponding boundary hair, and inserting the corresponding boundary hair.

5. A non-transitory computer readable storage medium containing executable instructions which, when executed in a processing system, cause the system to perform a method for the digital creation of hair effects comprising:
   constructing a seam that defines a boundary between at least two adjacently connected surface patches, wherein each of the adjacently connected surface patches is a distinct parametric surface and wherein at least one control hair is placed onto each of the adjacently connected surface patches;
   examining each control hair on the at least two adjacently connected surface patches;
   identifying a boundary hair from the examined control hairs of a first surface patch of the at least two adjacently connected surface patches, wherein the boundary hair is one of the examined control hairs that lies on the boundary;
   checking for a corresponding boundary hair from the examined control hairs of neighboring surface patches of the at least two adjacently connected surface patches, wherein the corresponding boundary hair is within a predetermined distance from the boundary hair;
   aligning the boundary hair of the first surface patch with the corresponding boundary hair of the neighboring surface patches, wherein the aligning is performed in response to locating the corresponding boundary hair;
   modifying the boundary hair, the corresponding boundary hair, and the examined control hairs to provide a visual groomed effect, wherein the modifying includes:
   creating at least one combing direction curve;

assigning at least one of the boundary hair, the corresponding boundary hair, and the examined control hairs to the combing direction curve, wherein the combing direction curve indicates the direction in which assigned control hairs are to be combed;

defining parameter values comprising bend, curvature, and fall-off parameter values for the combing direction curve, wherein the bend parameter value defines the closeness to the surface, the curvature parameter defines shape, and the fall-off parameter defines the degree of effect of the combing direction curve to the assigned control hairs;

processing the assigned control hairs based upon the combing direction curve they are assigned to and based upon the bend, curvature, and fall-off parameter values;

generating other hairs within the area based on the assigned control hair, the other hairs having approximately the same orientation as the assigned control hair; and displaying the hair on a display device.

6. The non-transitory computer readable storage medium as set forth in claim 5, wherein assigning at least one of the boundary hair, the corresponding boundary hair, and the examined control hairs further comprises identifying at least one of the boundary hair, the corresponding boundary hair, and the examined control hairs including at least one control vertex located below an underlying surface.

7. The non-transitory computer readable storage medium as set forth in claim 5, wherein processing the assigned control hair towards the combing direction curve further comprises rotating the assigned control hair above an underlying surface.

8. The non-transitory computer readable storage medium as set forth in claim 5, wherein the aligning is performed in response to determining the absence of the corresponding boundary hair, and inserting the corresponding boundary hair.

* * * * *